(12) United States Patent
Tsuchiya et al.

(10) Patent No.: US 10,839,834 B2
(45) Date of Patent: Nov. 17, 2020

(54) PIVOT ASSEMBLY BEARING DEVICE AND PIVOT ASSEMBLY BEARING DEVICE FABRICATION METHOD

(71) Applicant: MINEBEA MITSUMI Inc., Nagano (JP)

(72) Inventors: Kunihiro Tsuchiya, Tomioka (JP); Atsushi Kaneko, Nagano (JP); Tadashi Uchida, Saku (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/691,797

(22) Filed: Nov. 22, 2019

(65) Prior Publication Data

US 2020/0176025 A1 Jun. 4, 2020

(30) Foreign Application Priority Data

Nov. 30, 2018 (JP) .................................. 2018-225817
Sep. 12, 2019 (JP) .................................. 2019-166354

(51) Int. Cl.
| | |
|---|---|
| *G11B 5/48* | (2006.01) |
| *F16C 19/54* | (2006.01) |
| *F16C 19/06* | (2006.01) |
| *F16C 11/04* | (2006.01) |
| *F16C 35/063* | (2006.01) |
| *G11B 21/02* | (2006.01) |
| *G11B 5/55* | (2006.01) |

(52) U.S. Cl.
CPC .......... *G11B 5/4813* (2013.01); *F16C 11/045* (2013.01); *F16C 19/06* (2013.01); *F16C 19/54* (2013.01); *F16C 35/063* (2013.01); *G11B 21/02* (2013.01); *F16C 2370/12* (2013.01); *G11B 5/5521* (2013.01)

(58) Field of Classification Search
None
See application file for complete search history.

(56) References Cited

U.S. PATENT DOCUMENTS

| | | | | |
|---|---|---|---|---|
| 6,191,924 | B1* | 2/2001 | Koester ................ | G11B 5/4813 360/250 |
| 6,449,130 | B1* | 9/2002 | Koyama .............. | G11B 5/4813 360/264.4 |
| 7,428,125 | B2* | 9/2008 | Deguchi ................. | F16C 19/56 360/265.2 |
| 10,192,575 | B1* | 1/2019 | Resh ...................... | G11B 21/02 |
| 2002/0039259 | A1 | 4/2002 | Koyama et al. | |
| 2018/0358038 | A1* | 12/2018 | Keshavan ............ | G11B 5/5521 |
| 2018/0358039 | A1* | 12/2018 | Keshavan ............ | G11B 5/5521 |
| 2018/0374513 | A1* | 12/2018 | Keshavan ............ | G11B 5/4813 |

FOREIGN PATENT DOCUMENTS

| | | |
|---|---|---|
| JP | 2002-100128 A | 4/2002 |
| JP | 2005207455 A * | 8/2005 |

* cited by examiner

*Primary Examiner* — William J Klimowicz
(74) *Attorney, Agent, or Firm* — Pearne & Gordon LLP

(57) ABSTRACT

A technique for swinging swing arms stably by reducing vibrations of bearing units due to resonance in rolling bearings is provided. A pivot assembly bearing device 1 includes a shaft 10 extending in an axis Y1 direction, and an upper bearing unit 20 and a lower bearing unit 60 that are provided along the axis Y1 direction of the shaft 10. A natural frequency of the upper bearing unit 20 and a natural frequency of the lower bearing unit 60 in the axis Y1 direction of the shaft 10 differ from each other.

7 Claims, 11 Drawing Sheets

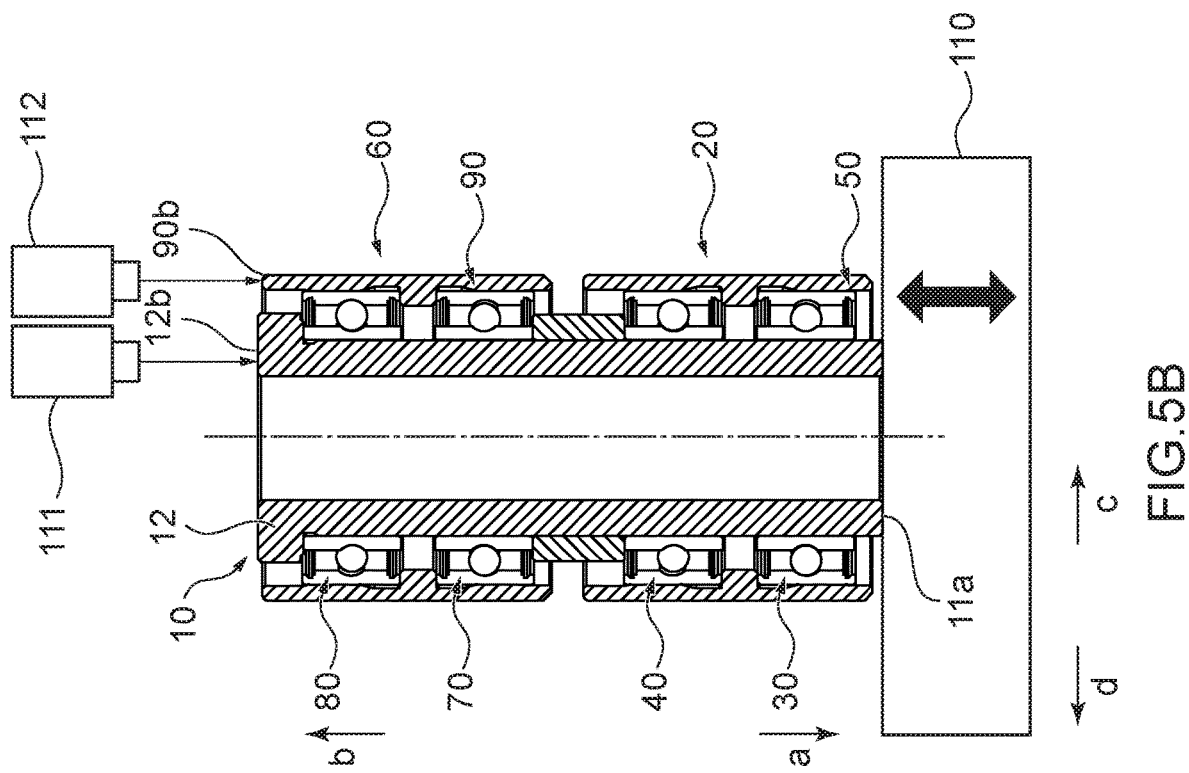
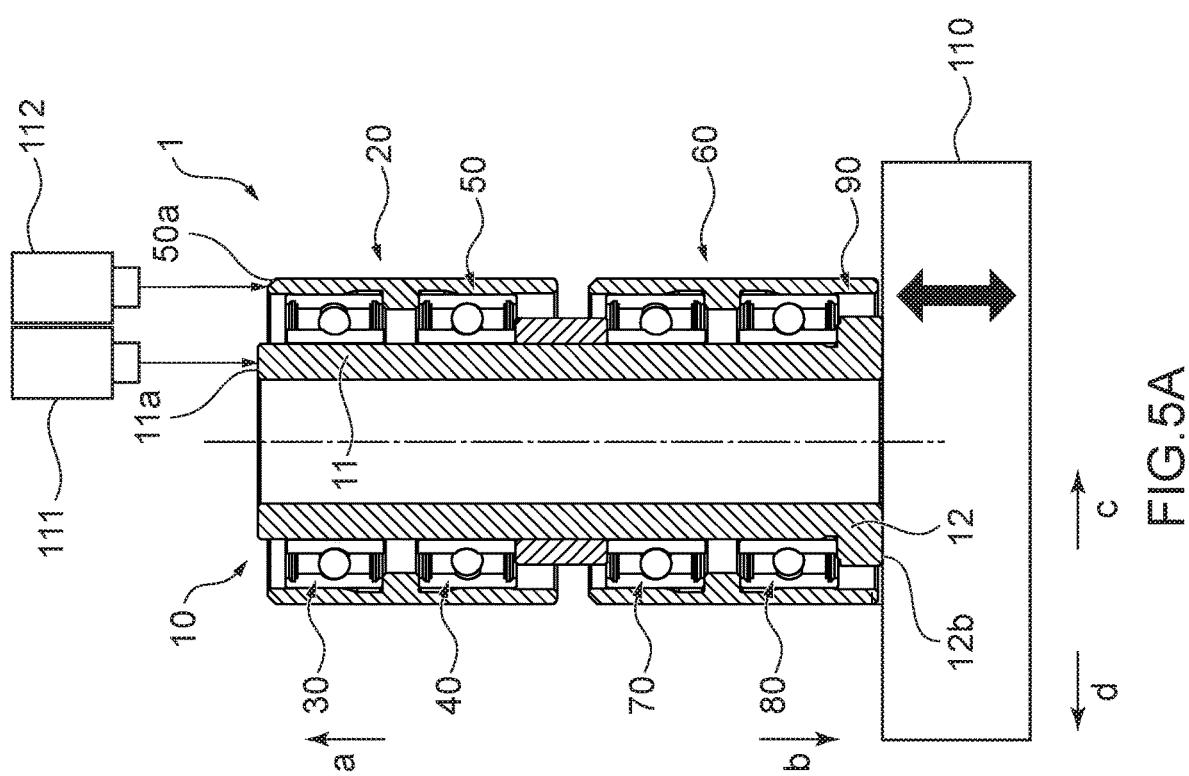

PIVOT ASSEMBLY BEARING DEVICE AND PIVOT ASSEMBLY BEARING DEVICE FABRICATION METHOD

CROSS REFERENCE TO RELATED APPLICATIONS

This application claims the benefit of Japanese Patent Application No. 2018-225817, filed Nov. 30, 2018, and Japanese Patent Application No. 2019-166354, filed Sep. 12, 2019, which are hereby incorporated by reference in its entirety.

BACKGROUND

Technical Field

The present disclosure relates to a pivot assembly bearing device and a pivot assembly bearing device fabrication method.

Background

A pivot assembly bearing device is used to swingably support a swing arm of a hard disk drive. The pivot assembly bearing device includes, for example, a cylindrical sleeve, a cylindrical shaft provided on an inner peripheral side of the sleeve, and a pair of rolling bearings provided between the sleeve and the shaft and configured to support the sleeve in a rotatable manner relative to the shaft. The rolling bearings are provided spaced apart from each other in a direction in which the shaft extends and are bonded to the shaft and the sleeve.

Additionally, as such a pivot assembly bearing device, there is disclosed a pivot assembly bearing device including a plurality of actuator blocks configured to swingably support a plurality of arm portions, which are a set of swing arms, individually and independently. According to this configuration, in each actuator block, a magnetic head disposed at a distal end of each swing arm is separately given access to a magnetic disk to write and read data (for example, refer to Japanese Patent Application Laid-Open No. 2002-100128).

SUMMARY

However, in the case where natural frequencies of rolling bearings composing the respective bearing units of the plurality of actuator blocks are the same or close to each other, there are possibilities that the bearing units resonate when the hard disk drive is driven. Here, in the event that the resonance of the bearing units can be reduced, the vibration of each actuator block can be reduced, whereby the swing arm can swing more stably.

The present disclosure is related to providing a technology which can allow a swing arm to swing stably by reducing the vibrations of a bearing unit that would be produced by resonance of rolling bearings.

According to an aspect of the present disclosure, there is provided a pivot assembly bearing device including a shaft that extends in an axial direction, and a first bearing unit and a second bearing unit that are provided in the axial direction of the shaft, and in the pivot assembly bearing device, the first bearing unit includes a pair of first rolling bearings provided in the axial direction of the shaft and each including a first inner ring fitted on the shaft, a first outer ring provided on an outer side of the first inner ring, and a plurality of first rolling elements that are provided between the first outer ring and the first inner ring, and a first sleeve fixed to outer peripheral surfaces of the respective first outer rings of the pair of first rolling bearings, the pair of first rolling bearings being preloaded, the second bearing unit includes a pair of second rolling bearings provided in the axial direction of the shaft and each including a second inner ring fitted on the shaft, a second outer ring provided on an outer side of the second inner ring, and a plurality of second rolling elements that are provided between the second outer ring and the second inner ring, and a second sleeve fixed to outer peripheral surfaces of the respective second outer rings of the pair of second rolling bearings, the pair of second rolling bearings being preloaded, and a natural frequency of the first bearing unit and a natural frequency of the second bearing unit differ from each other in the axial direction of the shaft.

Additionally, according to another aspect of the present disclosure, there is provided a pivot assembly bearing device fabrication method for fabricating a pivot assembly bearing device including a shaft that extends in an axial direction, and a first bearing unit and a second bearing unit that are provided in the axial direction of the shaft, the first bearing unit including a pair of first rolling bearings provided in the axial direction of the shaft and each including a first inner ring fitted on the shaft, a first outer ring provided on an outer side of the first inner ring, and a plurality of first rolling elements that are provided between the first outer ring and the first inner ring, and a first sleeve fixed to outer peripheral surfaces of the respective first outer rings of the pair of first rolling bearings, the second bearing unit including a pair of second rolling bearings provided in the axial direction of the shaft and each including a second inner ring fitted on the shaft, a second outer ring provided on an outer side of the second inner ring, and a plurality of second rolling elements that are provided between the second outer ring and the second inner ring, and a second sleeve fixed to outer peripheral surfaces of the respective second outer rings of the pair of second rolling bearings, the pivot assembly bearing device fabrication method comprising a first preloading step of preloading the pair of first rolling bearings; and a second preloading step of preloading the pair of second rolling bearing, and in this fabrication method, a preload applied in the first preloading step and a preload applied in the second preloading step are made to differ from each other, so that a natural frequency of the first bearing unit and a natural frequency of the second bearing unit are made to differ from each other in the axial direction of the shaft.

According to the pivot assembly bearing device of the present disclosure, the vibrations of the bearing units due to the resonance of the rolling bearings can be reduced to allow the swing arms to swing stably.

BRIEF DESCRIPTION OF THE DRAWINGS

FIGS. 5A and 5B are cross-sectional views illustrating a method for measuring natural frequency characteristics of the bearing units of the pivot assembly bearing device according to the first embodiment of the present disclosure;

DETAILED DESCRIPTION

Hereinafter, embodiments of the present disclosure will be described by reference to drawings.

Figure 1:
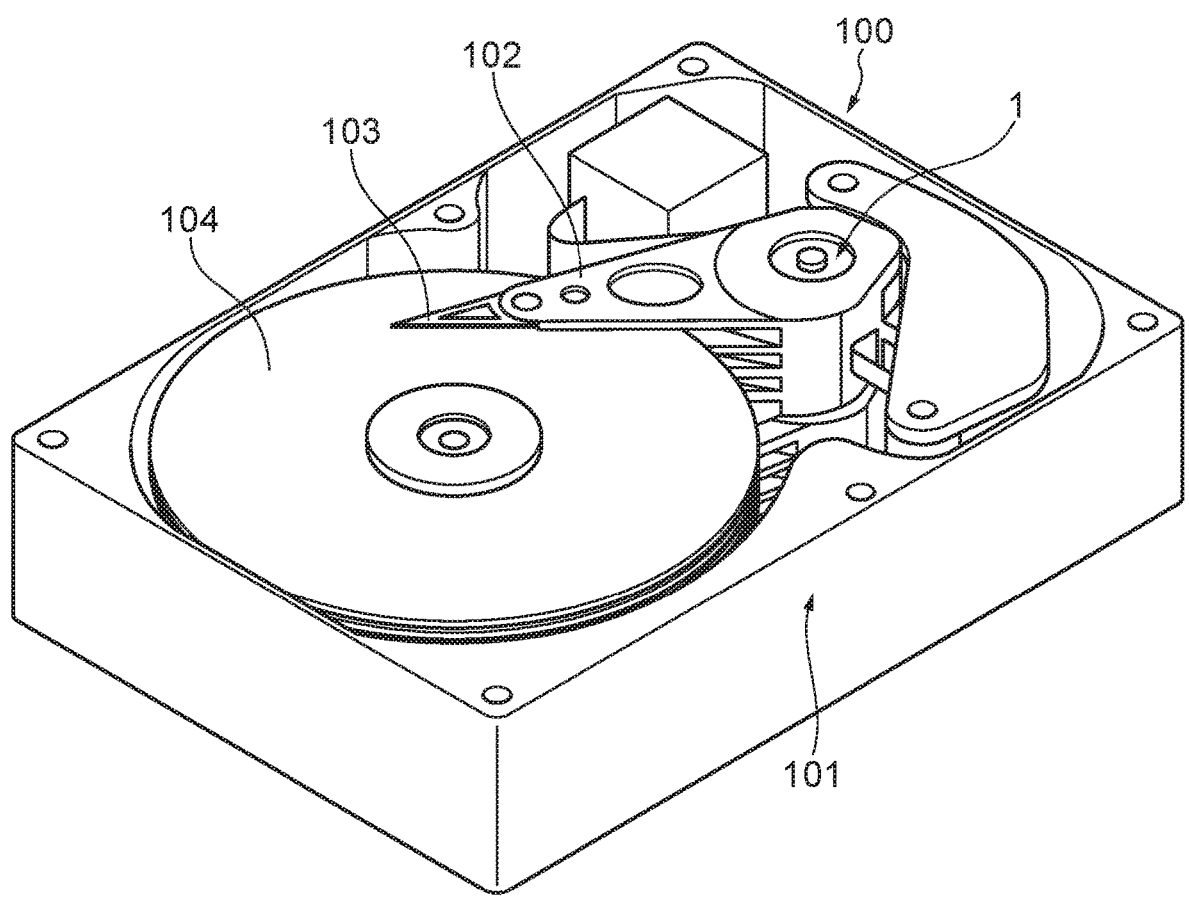
FIG. 1 is a perspective view illustrating a schematic configuration of a hard disk drive including a pivot assembly bearing device according to a first embodiment of the present disclosure.
Figure 2:
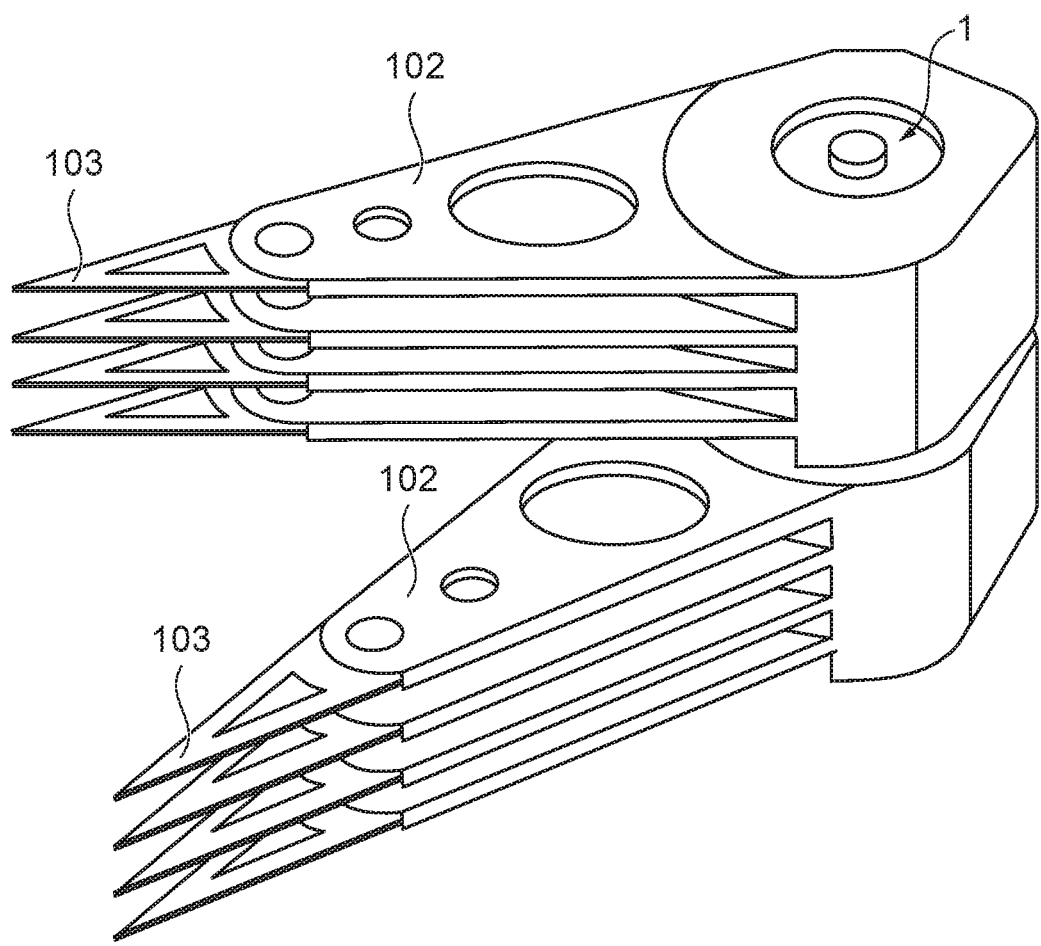
FIG. 2 is a perspective view illustrating a schematic configuration of a plurality of actuator blocks of the hard disk drive according to the first embodiment of the present disclosure.

FIG. 1 is a perspective view illustrating a schematic configuration of a hard disk drive 100 including a pivot assembly bearing device 1 according to a first embodiment of the present disclosure. FIG. 2 is a perspective view illustrating a schematic configuration of a plurality of actuator blocks of the hard disk drive 100. As shown in FIGS. 1, 2, the pivot assembly bearing device 1 is fixed to a bottom portion of a housing 101 of the hard disk drive 100 and swingably supports swing arms 102. The hard disk drive 100 includes head portions 103 provided at distal end portions of the swing arms 102, and the head portions 103 individually include a magnetic head provided at a distal end of the head portion 103. In the hard disk drive 100, the head portion 103 moves to a position lying above a rotating magnetic disk 104 not only to record information on the magnetic disk 104 but also to read information recorded on the magnetic disk 104.

As shown in FIG. 2, the hard disk drive 100 includes a plurality of (for example, eight) swing arms 102. The hard disk drive 100 can swing independently a desired number (for example, four) of swing arms 102 of the plurality of (for example, eight) swing arms 102 and the other number (for example, four) of swing arms 102 by an upper bearing unit 20 and a lower bearing unit 60, which will both be described later.

Figure 3:
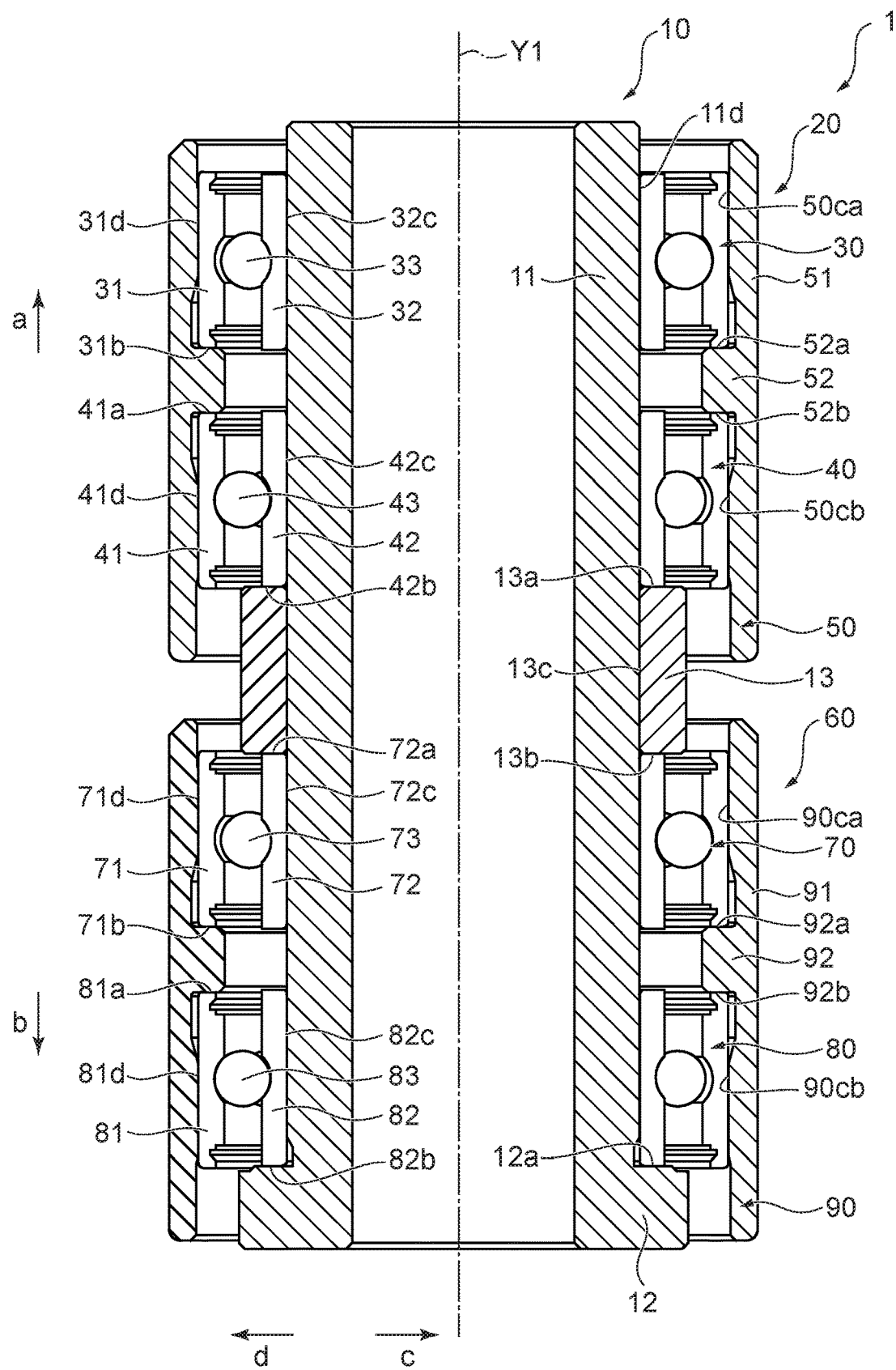
FIG. 3 is a cross-sectional view illustrating a schematic configuration of the pivot assembly bearing device according to the first embodiment of the present disclosure.

FIG. 3 is a cross-sectional view illustrating a schematic configuration of the pivot assembly bearing device 1 according to the first embodiment of the present disclosure. Hereinafter, as a matter of convenience, one (an arrow "a" direction) of directions along an axis Y1 (hereinafter, also referred to as an axis Y1 direction) of the pivot assembly bearing device 1 in FIG. 3 is referred to as an upper side, and the other (an arrow "b" direction) is referred to as a lower side. Additionally, one (an arrow "c" direction) of radial directions extending perpendicular to the axis Y1 of the pivot assembly bearing device 1 in FIG. 3 is referred to as a radially inner side, and the other (an arrow "d" direction) is referred to as a radially outer side. In the following description, when describing positional relationships or directions of constituent members using up, upward, upper or upper side, and down, downward, lower or lower side, the positional relationships or directions so described merely denote positional relationships or directions in the drawing and do not denote positional relationships or directions when the constituent members are assembled to an actual device.

The pivot assembly bearing device 1 according to the first embodiment of the present disclosure includes a shaft 10 that extends in the axis Y1 direction, an upper bearing unit 20 as a first bearing unit that is provided at an end portion of one side (an upper side) in the axis Y1 direction of the shaft 10, and a lower bearing unit 60 as a second bearing unit that is provided at an end portion of the other side (a lower side) in the axis Y1 direction of the shaft 10. Then, a natural frequency of the upper bearing unit 20 and a natural frequency of the lower bearing unit 60 in the axis Y1 direction of the shaft 10 differ from each other. Hereinafter, a specific configuration of the pivot assembly bearing device 1 will be described.

As illustrated in FIG. 3, in the pivot assembly bearing device 1, the upper bearing unit 20 includes an upper side upper rolling bearing 30 and an upper side lower rolling bearing 40 as a pair of first rolling bearings which include, respectively, inner rings 32, 42 as first inner rings, outer rings 31, 41 as first outer rings, and rolling elements 33, 43 (balls) as a plurality of first rolling elements and are disposed along the axis Y1 direction of the shaft 10. The inner rings 32, 42 are fitted on the shaft 10. The outer rings 31, 41 are disposed radially outwards of the inner rings 32, 42, respectively. The rolling elements 33, 43 are disposed between the outer rings 31, 41 and the inner rings 32, 42, respectively. The upper bearing unit 20 includes an upper sleeve 50 as a first sleeve that is fixed to outer peripheral surfaces 31d, 41d of the respective outer rings 31, 41 of the upper side upper rolling bearing 30 and the upper side lower rolling bearing 40. The upper side upper rolling bearing 30 and the upper side lower rolling bearing 40 are preloaded. The upper sleeve 50 is configured to be held rotatably to a radially outer side of the shaft 10 at an upper side (the arrow "a" direction) of the shaft 10 via the upper side upper rolling bearing 30 and the upper side lower rolling bearing 40.

In the pivot assembly bearing device 1, a spacer portion 52 as a first spacer portion is provided between the upper side upper rolling bearing 30 and the upper side lower rolling bearing 40 on an inner peripheral surface of the upper sleeve 50 such that end faces (a lower surface 31b, an upper surface 41a) of the outer rings 31, 41 that face each other are abutted with the spacer portion 52. Specifically, the upper sleeve 50 includes a cylindrical portion 51 that is a cylindrical portion extending parallel to the axis Y1 direction and the spacer portion 52 that is an annular portion that projects radially inwards from a center of the inner peripheral surface of the upper sleeve 50 in the axis Y1 direction, that is, a position lying between an upper inner peripheral surface 50ca and a lower inner peripheral surface 50cb. The cylindrical portion 51 and the spacer portion 52 are disposed concentrically and are centered at the axis Y1 as a center axis. The cylindrical portion 51 and the spacer portion 52 are formed integrally.

The cylindrical portion 51 and the spacer portion 52 are formed, for example, of austenitic stainless steel (SUS300 series). The cylindrical portion 51 and the spacer portion 52 may be formed of stainless steel such as martensitic stainless steel (SUS400 series) or ferritic stainless steel; aluminum material or titanium material, or a combination of these materials. Additionally, the cylindrical portion 51 and the spacer portion 52 may be formed separately and may be formed of different materials.

In the upper bearing unit 20, the upper rolling bearing includes the two rolling bearings. That is, the upper rolling bearing includes the upper side upper rolling bearing 30 that is positioned upwards in the axis Y1 direction and the upper side lower rolling bearing 40 that is spaced apart from and positioned downwards of the upper side upper rolling bearing 30 in the axis Y1 direction.

The upper side upper rolling bearing 30 and the upper side lower rolling bearing 40 are, for example, the same type of ball bearings. The upper side upper rolling bearing 30 and the upper side lower rolling bearing 40 are disposed concentrically and are centered at the axis Y1 as a center axis (a rotational axis). The upper side upper rolling bearing 30 and the upper side lower rolling bearing 40 are disposed concentrically with the upper sleeve 50.

The upper side upper rolling bearing 30 includes the outer ring 31 having a annular shape, the inner ring 32 disposed radially inwards of the outer ring 31 and having a annular shape, and the plurality of rolling elements 33 rollably disposed between the outer ring 31 and the inner ring 32. A diameter of the outer peripheral surface 31d of the outer ring 31 of the upper side upper rolling bearing 30 is slightly smaller than a diameter of the upper inner peripheral surface 50ca of the upper sleeve 50, and the upper side upper rolling bearing 30 is configured to have a loose fit with the upper sleeve 50. The outer peripheral surface 31d of the outer ring 31 of the upper side upper rolling bearing 30 is bonded to the upper inner peripheral surface 50ca of the upper sleeve 50 with an anaerobic adhesive such as an epoxy adhesive or an acryl adhesive.

The outer ring 31 of the upper side upper rolling bearing 30 is configured to be abutted with an upper surface 52a of the spacer portion 52 of the upper sleeve 50. The outer ring 31 and the inner ring 32 of the upper side upper rolling bearing 30 are formed of austenitic stainless steel (SU5300 series), which is the same material as the material of the upper sleeve 50. The outer ring 31 and the inner ring 32 of the upper side upper rolling bearing 30 may be formed of stainless steel such as martensitic stainless steel (SUS400 series) or ferritic stainless steel; aluminum material or titanium material, or a combination of these materials.

The upper side lower rolling bearing 40 includes the outer ring 41 having a annular shape, the inner ring 42 disposed radially inwards of the outer ring 41 and having a annular shape, and the plurality of rolling elements 43 rollably disposed between the outer ring 41 and the inner ring 42. A diameter of the outer peripheral surface 41d of the outer ring 41 of the upper side lower rolling bearing 40 is slightly smaller than a diameter of the lower inner peripheral surface 50cb of the upper sleeve 50, and the upper side lower rolling bearing 40 is configured to have a loose fit with the upper sleeve 50. The outer peripheral surface 41d of the outer ring 41 of the upper side lower rolling bearing 40 is bonded to the lower inner peripheral surface 50cb of the upper sleeve 50 with an anaerobic adhesive such as an epoxy adhesive or an acrylic adhesive.

The outer ring 41 of the upper side lower rolling bearing 40 is configured to be abutted with a lower surface 52b of the spacer portion 52 of the upper sleeve 50. The outer ring 41 and the inner ring 42 of the upper side lower rolling bearing 40 are formed of austenitic stainless steel (SUS300 series), which is the same material as the material of the upper sleeve 50. The outer ring 41 and the inner ring 42 of the upper side lower rolling bearing 40 may be formed of stainless steel such as martensitic stainless steel (SUS400 series) or ferritic stainless steel; aluminum material or titanium material, or a combination of these materials.

As illustrated in FIG. 3, in the pivot assembly bearing device 1, a collar portion 13 is provided between the upper bearing unit 20 and the lower bearing unit 60 on an outer peripheral surface of the shaft 10 (an outer peripheral surface 11d of a cylindrical portion 11) such that an end face (a lower surface 42b) of the inner ring 42 of the upper side lower rolling bearing 40 and an end face (an upper surface 72a) of an inner ring 72 of a lower side upper rolling bearing 70, which face each other, are abutted with the collar portion 13. The shaft 10 includes the cylindrical portion 11 and a flange portion 12. The cylindrical portion 11 constitutes a portion having a cylindrical shape that extends parallel to the axis Y1 direction. The flange portion 12 constitutes a portion having an annular shape that projects radially outwards from a lower (in an arrow "b" direction) end of the outer peripheral surface 11d of the cylindrical portion 11 in the axis Y1 direction. The collar portion 13 is a member having an annular shape that is disposed on a radially outer side of a center of the outer peripheral surface 11d of the cylindrical portion 11 in the axis Y1 direction.

The cylindrical portion 11, the flange portion 12 and the collar portion 13 are disposed concentrically and are centered at the axis Y1 as a center axis. The cylindrical portion 11, the flange portion 12 and the collar portion 13 are disposed concentrically with the upper side upper rolling bearing 30 and the upper side lower rolling bearing 40. The cylindrical portion 11 and the flange portion 12 are formed integrally.

The cylindrical portion 11, the flange portion 12 and the collar portion 13 are formed of austenitic stainless steel (SUS300 series) and are formed of the same material as that of the upper sleeve 50. The outer ring 41 and the inner ring 42 of the upper side lower rolling bearing 40 may be formed of stainless steel such as martensitic stainless steel (SUS400 series) or ferritic stainless steel; aluminum material or titanium material or may be formed of a combination of these materials.

A diameter of the outer peripheral surface 11d of the cylindrical portion 11 of the shaft 10 is slightly smaller than a diameter of an inner peripheral surface 32c of the inner ring 32 of the upper side upper rolling bearing 30 and a diameter of an inner peripheral surface 42c of the inner ring 42 of the upper side lower rolling bearing 40. The cylindrical portion 11 of the shaft 10 is configured to have a loose fit with the upper side upper rolling bearing 30 and the upper side lower rolling bearing 40. The inner peripheral surfaces 32c, 42c of the inner rings 32, 42 of the upper side upper rolling bearing 30 and the upper side lower rolling bearing 40 are bonded to an upper side (the arrow "a" direction) of the outer peripheral surface 11d of the cylindrical portion 11 of the shaft 10 with an anaerobic adhesive such as an epoxy adhesive or an acrylic adhesive. An upper surface 13a of the collar portion 13 of the shaft 10 is configured to be abutted with the inner ring 42 of the upper side lower rolling bearing 40.

On the other hand, as illustrated in FIG. 3, in the pivot assembly bearing device 1, the lower bearing unit 60 includes a lower side upper rolling bearing 70 and a lower side lower rolling bearing 80 as a pair of second rolling bearings which include, respectively, inner rings 72, 82 as second inner rings, outer rings 71, 81 as second outer rings, and rolling elements 73, 83 as a plurality of second rolling elements and are disposed along the axis Y1 direction of the shaft 10. The inner rings 72, 82 are fitted on the shaft 10. The outer rings 71, 81 are disposed radially outwards of the inner rings 72, 82, respectively. The rolling elements 73, 83 are disposed between the outer rings 71, 81 and the inner rings 72, 82, respectively. The lower bearing unit 60 includes a lower sleeve 90 as a second sleeve that is fixed to outer peripheral surfaces 71d, 81d of the respective outer rings 71, 81 of the lower side upper rolling bearing 70 and the lower side lower rolling bearing 80. The lower side upper rolling bearing 70 and the lower side lower rolling bearing 80 are preloaded.

The lower sleeve 90 is configured to be held rotatably to a radially outer side of the shaft 10 at a lower side (the arrow "b" direction) of the shaft 10 via the lower side upper rolling bearing 70 and the lower side lower rolling bearing 80. The lower bearing unit 60 is disposed on a lower side (in the arrow "b" direction) of the shaft 10 while being aligned with the upper bearing unit 20 in the axis Y1 direction. The lower bearing unit 60 has the same structure as that of the upper bearing unit 20 and is made of the same material as that of the upper bearing unit 20. The lower sleeve 90 is disposed spaced apart from the upper sleeve 50 with a predetermined gap provided between the lower sleeve 90 and the upper sleeve 50, and is configured to swing independently of the upper sleeve 50.

In the pivot assembly bearing device 1, a spacer portion 92 as a second spacer portion is provided between the lower side upper rolling bearing 70 and the lower side lower rolling bearing 80 on an inner peripheral surface of the lower sleeve 90 such that end faces (a lower surface 71b, an upper surface 81a) of the outer rings 71, 81 that face each other are abutted with the spacer portion 92. Specifically, the lower sleeve 90 includes a cylindrical portion 91 that is a cylindrical portion extending parallel to the axis Y1 direction and the spacer portion 92 that is an annular portion that projects radially inwards from a center of the inner peripheral surface of the lower sleeve 90 in the axis Y1 direction, that is, a position lying between an upper inner peripheral surface 90ca and a lower inner peripheral surface 90cb. The cylindrical portion 91 and the spacer portion 92 are disposed concentrically and are centered at the axis Y1 as a center axis. The cylindrical portion 91 and the spacer portion 92 are formed integrally.

The cylindrical portion 91 and the spacer portion 92 are formed, for example, of austenitic stainless steel (SUS300 series). The cylindrical portion 91 and the spacer portion 92 may be formed of stainless steel such as martensitic stainless steel (SUS400 series) or ferritic stainless steel; aluminum material or titanium material, or a combination of these materials. Additionally, the cylindrical portion 91 and the spacer portion 92 may be formed separately and may be formed of different materials.

In the lower bearing unit 60, the lower rolling bearing includes the two rolling bearings. That is, the lower rolling bearing includes the lower side upper rolling bearing 70 that is positioned upwards (the arrow "a" direction) in the axis Y1 direction and the lower side lower rolling bearing 80 that is spaced apart from and positioned downwards (the arrow "b" direction) of the lower side upper rolling bearing 70 in the axis Y1 direction.

The lower side upper rolling bearing 70 and the lower side lower rolling bearing 80 are, for example, the same type of ball bearings. The lower side upper rolling bearing 70 and the lower side lower rolling bearing 80 are disposed concentrically and are centered at the axis Y1 as a center axis (a rotational axis). The lower side upper rolling bearing 70 and the lower side lower rolling bearing 80 are disposed concentrically with the lower sleeve 90.

The lower side upper rolling bearing 70 includes the outer ring 71 having a annular shape, the inner ring 72 disposed radially inwards of the outer ring 71 and having a annular shape, and the rolling elements 73 rollably disposed between the outer ring 71 and the inner ring 72. A diameter of the outer peripheral surface 71d of the outer ring 71 of the lower side upper rolling bearing 70 is slightly smaller than a diameter of the upper inner peripheral surface 90ca of the lower sleeve 90, and the lower side upper rolling bearing 70 is configured to have a loose fit with the lower sleeve 90. The outer peripheral surface 71d of the outer ring 71 of the lower side upper rolling bearing 70 is bonded to the upper inner peripheral surface 90ca of the lower sleeve 90 with an anaerobic adhesive such as an epoxy adhesive or an acryl adhesive.

The outer ring 71 of the lower side upper rolling bearing 70 is configured to be abutted with the collar portion 13 of the shaft 10 at a lower surface 13b of the collar portion 13. The outer ring 71 and the inner ring 72 of the lower side upper rolling bearing 70 are formed of austenitic stainless steel (SUS300 series), which is the same material as the material of the lower sleeve 90. The outer ring 71 and the inner ring 72 of the lower side upper rolling bearing 70 may be formed of stainless steel such as martensitic stainless steel (SUS400 series) or ferritic stainless steel; aluminum material or titanium material, or a combination of these materials.

The lower side lower rolling bearing 80 includes the outer ring 81 having a annular shape, the inner ring 82 disposed radially inwards of the outer ring 81 and having a annular shape, and the rolling elements 83 rollably disposed between the outer ring 81 and the inner ring 82. A diameter of the outer peripheral surface 81d of the outer ring 81 of the lower side lower rolling bearing 80 is slightly smaller than a diameter of the lower inner peripheral surface 90cb of the lower sleeve 90, and the lower side lower rolling bearing 80 is configured to have a loose fit with the lower sleeve 90. The outer peripheral surface 81d of the outer ring 81 of the lower side lower rolling bearing 80 is bonded to the lower inner peripheral surface 90cb of the lower sleeve 90 with an anaerobic adhesive such as an epoxy adhesive or an acrylic adhesive.

The inner ring 82 of the lower side lower rolling bearing 80 is configured to be abutted with the flange portion 12 of the shaft 10 at an upper surface 12a of the flange portion 12. The outer ring 81 and the inner ring 82 of the lower side lower rolling bearing 80 are formed of austenitic stainless steel (SUS300 series), which is the same material as the material of the lower sleeve 90. The outer ring 81 and the inner ring 82 of the lower side lower rolling bearing 80 may be formed of stainless steel such as martensitic stainless steel (SUS400 series) or ferritic stainless steel; aluminum material or titanium material, or a combination of these materials.

A diameter of the outer peripheral surface 11d of the cylindrical portion 11 of the shaft 10 is slightly smaller than a diameter of an inner peripheral surface 72c of the inner ring 72 of the lower side upper rolling bearing 70 and a diameter of an inner peripheral surface 82c of the inner ring 82 of the lower side lower rolling bearing 80. The cylindrical portion 11 of the shaft 10 is configured to have a loose fit with the lower side upper rolling bearing 70 and the lower side lower rolling bearing 80. The outer peripheral surfaces 71d, 81d of the outer rings 71, 81 of the lower side upper rolling bearing 70 and the lower side lower rolling bearing 80 are bonded to a lower side (the arrow "b" direction) of the outer peripheral surface 11d of the cylindrical portion 11 of the shaft 10 with an anaerobic adhesive such as an epoxy adhesive or an acrylic adhesive.

As illustrated in FIG. 3, in an assembled state of the pivot assembly bearing device 1, the upper bearing unit 20 and the lower bearing unit 60 are positioned at a predetermined interval in the axis Y1 direction via the collar portion 13 with a predetermined preload applied to the upper bearing unit 20 and the lower bearing unit 60 individually. Specifically, a lower surface 42b of the inner ring 42 of the upper side lower rolling bearing 40 of the upper bearing unit 20 is abutted with the upper surface 13a of the collar portion 13 of the shaft 10, and the upper surface 41a of the outer ring 41 of the upper side lower rolling bearing 40 is abutted with the lower surface 52b of the spacer portion 52 of the upper sleeve 50. Additionally, the lower surface 31b of the outer ring 31 of the upper side upper rolling bearing 30 of the upper bearing unit 20 is abutted with the upper surface 52a of the spacer portion 52 of the upper sleeve 50.

The upper surface 72a of the inner ring 72 of the lower side upper rolling bearing 70 of the lower bearing unit 60 is abutted with the lower surface 13b of the collar portion 13 of the shaft 10, and the lower surface 71b of the outer ring 71 of the lower side upper rolling bearing 70 is abutted with the upper surface 92a of the spacer portion 92 of the lower sleeve 90. Additionally, the upper surface 81a of the outer ring 81 of the lower side lower rolling bearing 80 of the lower bearing unit 60 is abutted with the lower surface 92b of the spacer portion 92 of the lower sleeve 90, and the lower surface 82b of the inner ring 82 of the lower side lower rolling bearing 80 is abutted with the upper surface 12a of the flange portion 12 of the shaft 10.

In this configuration, in the pivot assembly bearing device 1 according to the first embodiment of the present disclosure, the preload applied to the upper side upper rolling bearing 30 and the upper side lower rolling bearing 40 of the upper bearing unit 20 differs from the preload applied to the lower side upper rolling bearing 70 and the lower side lower rolling bearing 80 of the lower bearing unit 60. In other words, in the upper bearing unit 20 and the lower bearing unit 60 of the pivot assembly bearing device 1, other conditions than the preloads that influence the natural frequencies of the upper bearing unit 20 and the lower bearing unit 60, which will be described later, for example, the dimensions, materials and the like of the rolling bearings are the same. Specifically, in the pivot assembly bearing device 1 according to the first embodiment of the present disclosure, a preload of 1000 (gf) is applied to the upper side upper rolling bearing 30 and the upper side lower rolling bearing 40 of the upper bearing unit 20, while a preload of 150 (gf) is applied to the lower side upper rolling bearing 70 and the lower side lower rolling bearing 80 of the lower bearing unit 60. As a result, in the pivot assembly bearing device 1 according to the first embodiment of the present disclosure, a natural frequency of the upper bearing unit 20 and a natural frequency of the lower bearing unit 60 in the axis Y1 direction of the shaft 10 can be made to differ by 2 kHz or more.

Hereinafter, a definition of the natural frequencies of the upper bearing unit 20 and the lower bearing unit 60, the natural frequency characteristics of the upper bearing unit 20 and the lower bearing unit 60, a natural frequency characteristic measuring method and a natural frequency characteristic calculation method, and a relationship between preload and natural frequency of the upper bearing unit 20 and the lower bearing unit 60 will be described in detail.

Figure 4:
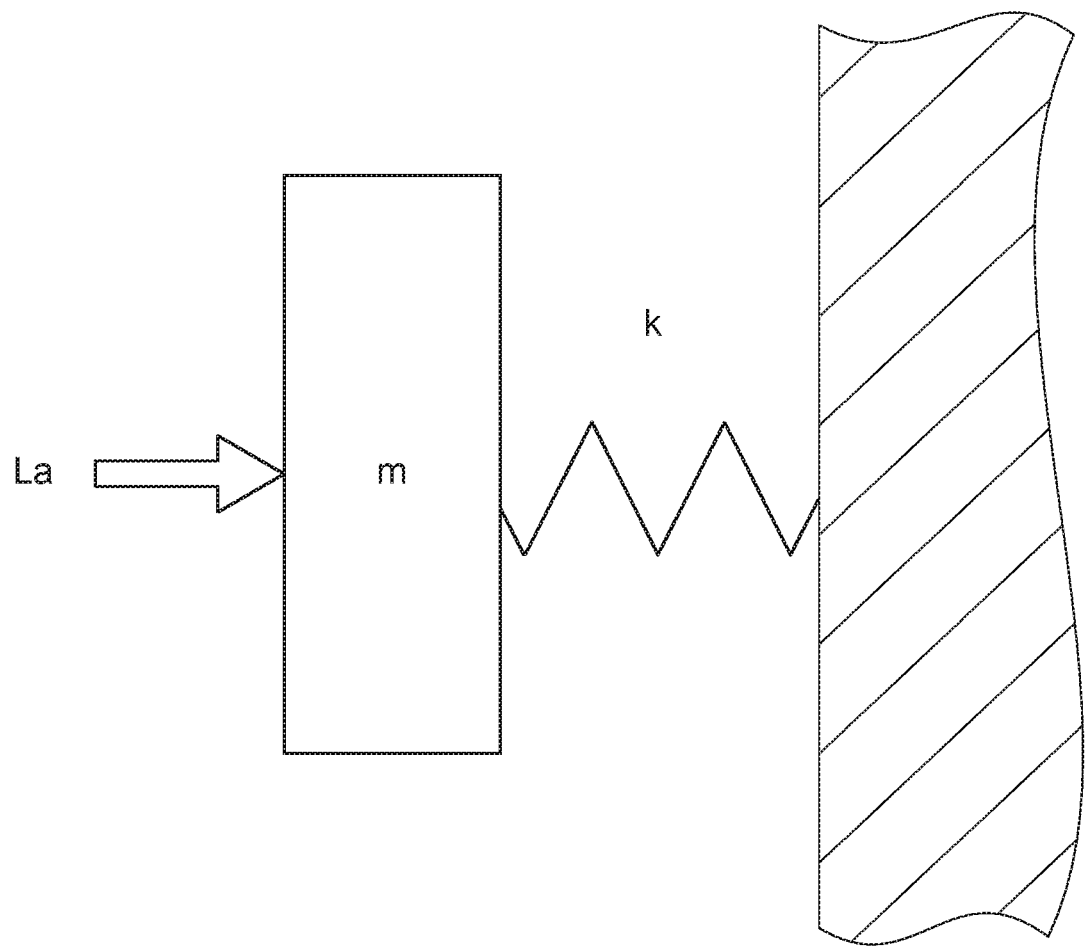
FIG. 4 is a drawing illustrating a vibration model in an axial direction of each bearing unit of the pivot assembly bearing device according to the first embodiment of the present disclosure.

Firstly, a definition of the natural frequencies of the upper bearing unit 20 and the lower bearing unit 60 of the pivot assembly bearing device 1 will be described. FIG. 4 is a drawing illustrating a vibration model in the axis Y1 direction of the upper bearing unit 20 and the lower bearing unit 60 of the pivot assembly bearing device 1. As illustrated in FIG. 4, for vibrations in the axis Y1 direction of the upper bearing unit 20 and the lower bearing unit 60, the upper bearing unit 20 and the lower bearing unit 60 can be represented as a vibration model of a mass-spring system.

That is, a spring constant in the axis Y1 direction of the upper bearing unit 20 is referred to as k, and a total mass of the outer ring 31 of the upper side upper rolling bearing 30 and the outer ring 41 of the upper side lower rolling bearing 40 of the upper bearing unit 20, and the upper sleeve 50 is referred to as m. In this case, a natural frequency Fn in the axis Y1 direction of the upper bearing unit 20 when a load La in the axis Y1 direction is applied can be expressed by the following expression (1).

Additionally, a spring constant in the axis Y1 direction of the lower bearing unit 60 is referred to as k, and a total mass of the outer ring 71 of the lower side upper rolling bearing 70 and the outer ring 81 of the lower side lower rolling bearing 80 of the lower bearing unit 60, and the lower sleeve 90 is referred to as m. In this case, a natural frequency Fn in the axis Y1 direction of the lower bearing unit 60 when a load La in t axis Y1 direction is applied can also be expressed by the following expression (1).

A spring constant k is calculated from the preloads that are applied to the upper bearing unit 20 and the lower bearing unit 60, the materials of the upper bearing unit 20 and the lower bearing unit 60, various parameters (specifications (radial gap, inner and outer ring curvature ratio)) of the rolling bearings 30, 40, 70, 80, and the like.

[Expression 1]

$$Fn = \frac{1}{2\pi}\sqrt{k/m} \tag{1}$$

In this way, the natural frequencies Fn of the upper bearing unit 20 and the lower bearing unit 60 of in the pivot assembly bearing device 1 can be defined.

Next, a measuring method of natural frequency characteristics of the upper bearing unit 20 and the lower bearing unit 60 of the pivot assembly bearing device 1 will be described. FIGS. 5A and 5B are cross-sectional views illustrating a method for measuring natural frequency characteristics of the upper bearing unit 20 and the lower bearing unit 60 of the pivot assembly bearing device 1. Firstly, a measuring method for measuring natural frequency characteristics of the upper bearing unit 20 of the pivot assembly bearing device 1 will be described.

As illustrated in FIG. 5A, in the measuring method for measuring natural frequency characteristics of the upper bearing unit 20, the lower surface 12b of the flange portion 12 of the shaft 10 of the pivot assembly bearing device 1 is rested on and fixed to a vibrator 110. The vibrator 110 is configured to vibrate the pivot assembly bearing device 1 in the axis Y1 direction.

As illustrated in FIG. 5A, in the method for measuring the natural frequency characteristics of the upper bearing unit 20, a speed sensor 111 is disposed above (the arrow "a"

direction) of an upper surface 11a of the cylindrical portion 11 of the shaft 10 of the pivot assembly bearing device 1. A speed sensor 112 is disposed above (the arrow "a" direction) an upper surface 50a of the upper sleeve 50 of the upper bearing unit 20.

Firstly, the vibrator 110 vibrates the pivot assembly bearing device 1 while gradually increasing the vibration frequency. Following this, the speed sensor 111 radiates, for example, a laser beam of helium neon (He—Ne) of the wavelength on the order of 630 nm on to the upper surface 11a of the cylindrical portion 11 of the shaft 10 and transforms a Doppler frequency of reflected light into an electric signal (speed data V1). Additionally, the speed sensor 112 irradiates, for example, a laser beam of helium neon (He—Ne) of the wavelength on the order of 630 nm on to the upper surface 50a of the upper sleeve 50 of the upper bearing unit 20 and transforms a Doppler frequency of reflected light into an electric signal (speed data V2).

Next, an FFT (fast Fourier transform) analyzer executes an FFT analysis on the speed data V1 received from the speed sensor 111 to transform the speed data V1 into FFT data F1 and also executes an FFT analysis on the speed data V2 received from the speed sensor 112 to transform the speed data V2 into FFT data F2. Then, the FFT (fast Fourier transform) analyzer executes a gain calculation on the FFT data F1 and the FFT data F2 to transform them into a gain G1.

Figure 6:
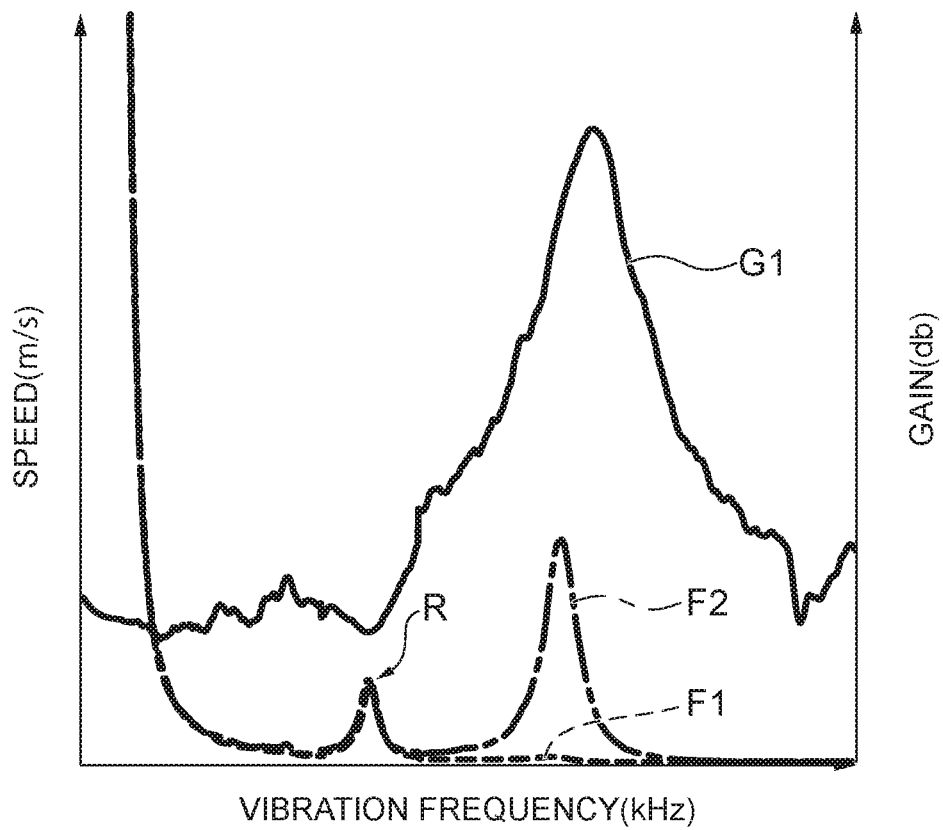
FIG. 6 is a graph illustrating a method for calculating natural frequency characteristics of the bearing units of the pivot assembly bearing device according to the first embodiment of the present disclosure.

FIG. 6 is a graph illustrating a calculation method for calculating natural frequency characteristics of the upper bearing unit 20 and the lower bearing unit 60 of the pivot assembly bearing device 1. In FIG. 6, a horizontal axis denotes frequency (kHz), a left vertical axis denotes speed (m/s), and a right vertical axis denotes gain (dB). In FIG. 6, F1 denotes FFT data F1 in which the FFT analysis is executed on the speed data V1, F2 denotes FFT data F2 in which the FFT analysis is executed on the speed data V2, and G1 denotes a gain G1 of the upper bearing unit 20. In this case, the gain G1 of the upper bearing unit 20 can be expressed by the following expression (2).

$$dB = 10 \, \text{Log}_{10}(F2/F1) \quad (2)$$

In this way, the gain G1 of the upper bearing unit 20 of the pivot assembly bearing device 1, that is, the natural frequency characteristics of the upper bearing unit 20 can be calculated.

A similar waveform R appears both in the FFT data F1 and the FFT data F2 as illustrated in FIG. 6 also when a resonance is generated, for example, in the vibrator 110 or a jig. The resonance based on the vibrator 110 or the jig can be removed by executing the gain calculation by the expression (2) as described above.

Next, a measuring method for measuring natural frequency characteristics of the lower bearing unit 60 of the pivot assembly bearing device 1 will be described. As illustrated in FIG. 5B, in the measuring method for measuring natural frequency characteristics of the lower bearing unit 60, the pivot assembly bearing device 1 is reset reversely in the axis Y1 direction (the arrow "a" direction, the arrow "b" direction). That is, the upper surface 11a of the cylindrical portion 11 of the shaft 10 of the pivot assembly bearing device 1 is rested on and fixed to the vibrator 110.

As illustrated in FIG. 5B, in the measuring method for measuring natural frequency characteristics of the lower bearing unit 60, the speed sensor 111 is disposed below (the arrow "b" direction) the lower surface 12b of the flange portion 12 of the shaft 10 of the pivot assembly bearing device 1. The speed sensor 112 is disposed below (the arrow "b" direction) of the lower surface 90b of the lower sleeve 90 of the lower bearing unit 60.

Firstly, the vibrator 110 vibrates the pivot assembly bearing device 1 while gradually increasing the frequency. Following this, the speed sensor 111 radiates, for example, a laser beam of helium neon (He—Ne) of the wavelength on the order of 630 nm on to the lower surface 12b of the flange portion 12 of the shaft 10 and transforms a Doppler frequency of reflected light into an electric signal (speed data V3). Additionally, the speed sensor 112 radiates, for example, a laser beam of helium neon (He—Ne) of the wavelength on the order of 630 nm on to the lower surface 90b of the lower sleeve 90 and transforms a Doppler frequency of reflected light into an electric signal (speed data V4).

Next, the FFT (fast Fourier transform) analyzer executes an FFT analysis on the speed data V3 received from the speed sensor 111 to transform the speed data V1 into FFT data F3 and also executes an FFT analysis on the speed data V4 received from the speed sensor 112 to transform the speed data V4 into FFT data F4. Then, the FFT (fast Fourier transform) analyzer executes a gain calculation on the FFT data F3 and the FFT data F4 to transform them into a gain G2. In this way, the gain G2 of the lower bearing unit 60 of the pivot assembly bearing device 1, that is, the natural frequency characteristics of the lower bearing unit 60 can be calculated.

Figure 7:
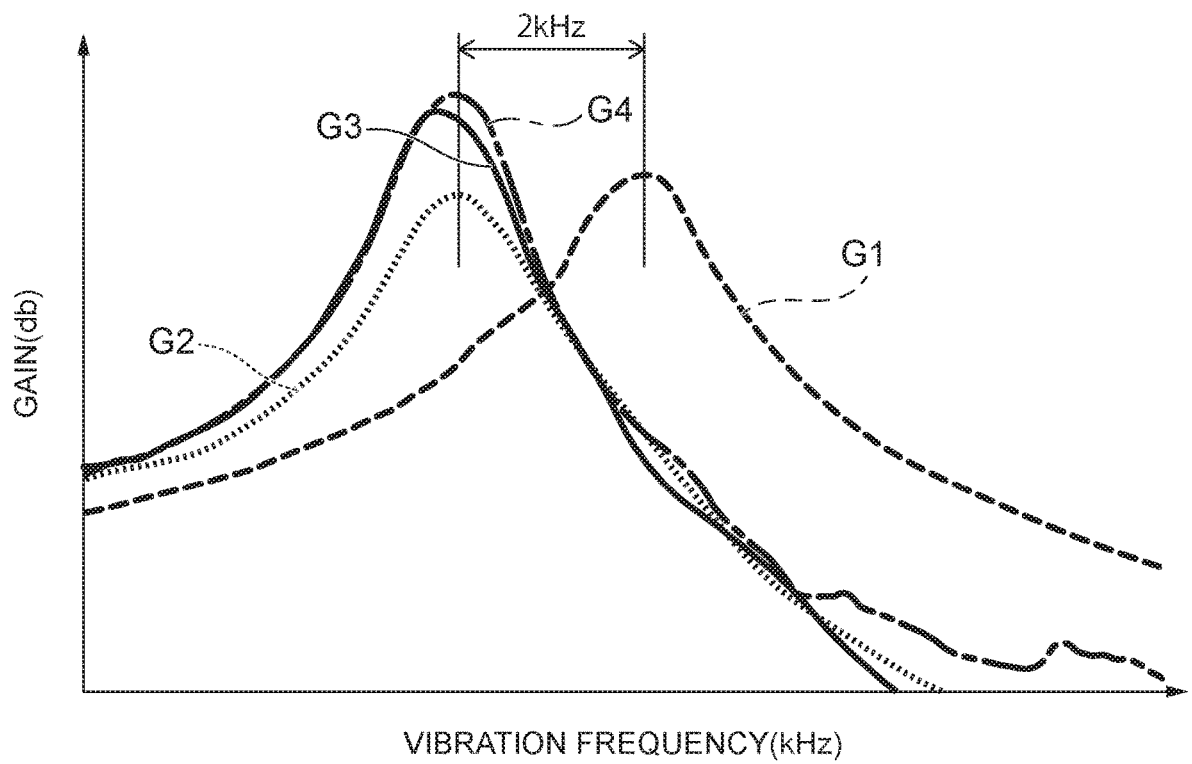
FIG. 7 is a graph showing natural frequency characteristics of the bearing units of the pivot assembly bearing device according to the first embodiment of the present disclosure.

FIG. 7 is a graph illustrating the natural frequency characteristics of the bearing units of the pivot assembly bearing device 1. In FIG. 7, a horizontal axis denotes vibration frequency (kHz) and a vertical axis denotes gain (dB). In FIG. 7, G1 denotes the gain G1 of the upper bearing unit 20, that is, the natural frequency characteristics of the upper bearing unit 20, and G2 denotes the gain G2 of the lower bearing unit 60, that is, the natural frequency characteristics of the lower bearing unit 60. As described above, the preload of 1000 (gf) is applied to the upper bearing unit 20, and the preload of 150 (gf) is applied to the lower bearing unit 60. That is, the upper bearing unit 20 and the lower bearing unit 60 are preloaded differently.

As can be seen from FIG. 7, the natural frequency of the upper bearing unit 20, that is, a peak (a maximum value) of the gain G1 of the upper bearing unit 20 and the natural frequency of the lower bearing unit 60, that is, a peak of the gain G2 of the lower bearing unit 60 differ by 2 kHz from each other. In this way, it can be seen that in the case where the preload of 1000 (gf) is applied to the upper bearing unit 20, while the preload of 150 (gf) is applied to the lower bearing unit 60, the natural frequency of the upper bearing unit 20 and the natural frequency of the lower bearing unit 60 differ by 2 kHz from each other.

In addition, in FIGS. 7, G3 and G4 denote the gain G3 of the upper bearing unit 20 and the gain G4 of the lower bearing unit 60 when the preload of 150 (gf) is applied to both the upper bearing unit 20 and the lower bearing unit 60, that is, the preloads applied to the upper bearing unit 20 and the lower bearing unit 60 are the same. In FIG. 7, G3 denotes the gain G3 of the upper bearing unit 20, that is, the natural frequency characteristics of the upper bearing unit 20 when the preloads that are applied to the upper bearing unit 20 and the lower bearing unit 60 are the same. Additionally, G4 denotes the gain G4 of the lower bearing unit 60, that is, the natural frequency characteristics of the lower bearing unit 60 when the preloads that are applied to the upper bearing unit 20 and the lower bearing unit 60 are the same.

As can be seen from FIG. 7, peaks (maximum values) of the gains G3, G4 when the preloads applied to the upper bearing unit 20 and the lower bearing unit 60 are the same are greater than peaks (maximum values) of the gains G1, G2 when the preloads applied to the upper bearing unit 20 and the lower bearing unit 60 are different. This is because a resonance is generated in the gains G3, G4 of the upper bearing unit 20 and the lower bearing unit 60.

On the other hand, unlike the gains G3, G4 resulting when the preloads applied to the upper bearing unit 20 and the lower bearing unit 60 are the same, the peaks (the maximum values) of the gains G1, G2 resulting when the preloads applied to the upper bearing unit 20 and the lower bearing unit 60 are different are not increased, and hence, no resonance is generated. In this way, it can be seen that no resonance is generated when the natural frequency of the upper bearing unit 20 and the natural frequency of the lower bearing unit 60 differ by 2 kHz or more.

Next, a fabrication method of the pivot assembly bearing device 1 will be described by reference to FIG. 3. The fabrication method of the pivot assembly bearing device 1 includes a first preloading step of preloading the upper side upper rolling bearing 30 and the upper side lower rolling bearing 40 of the upper bearing unit 20 and a second preloading step of preloading the lower side upper rolling bearing 70 and the lower side lower rolling bearing 80 of the lower bearing unit 60. In the fabrication method of the pivot assembly bearing device 1, a preload applied in the first preloading step is made to differ from a preload applied in the second preloading step, so that the natural frequency of the upper bearing unit 20 and the natural frequency of the lower bearing unit 60 in the axis Y1 direction of the shaft 10 are made to differ from each other.

Briefly, first, after the lower bearing unit 60 is assembled to an end portion on a lower side (the arrow "b" direction) of the shaft 10, the upper bearing unit 20 is assembled to an end portion on an upper side (the arrow "a" direction) of the shaft 10. This assembling step of the lower bearing unit 60 includes the step of applying the preloads to the pair of the lower side upper rolling bearing 70 and the lower side lower rolling bearing 80. Additionally, the assembling step of the upper bearing unit 20 includes the step of applying the preloads to the pair of the upper side upper rolling bearing 30 and the upper side lower rolling bearing 40.

Specifically, first, the lower side lower rolling bearing 80 is fitted on the shaft 10, and the lower surface 82*b* of the inner ring 82 is abutted with the upper surface 12*a* of the flange portion 12. In this state, the outer peripheral surface 11*d* of the shaft 10 and the inner peripheral surface 82*c* of the inner ring 82 are bonded together. Before the lower side upper rolling bearing 70 is fitted on the shaft 10, the lower side upper rolling bearing 70 is fitted in the lower sleeve 90, and the lower surface 71*b* of the outer ring 71 is abutted with the upper surface 92*a* of the spacer portion 92, in which state the outer peripheral surface 71*d* of the outer ring 71 and the upper inner peripheral surface 90*ca* of the lower sleeve 90 are bonded together in advance. The lower side upper rolling bearing 70 bonded to the lower sleeve 90 is fitted on the shaft 10, and the lower surface 92*b* of the spacer portion 92 is abutted with the upper surface 81*a* of the outer ring 81 of the lower side lower rolling bearing 80. Further, the inner ring 72 of the lower side upper rolling bearing 70 is pushed from the upper side towards the lower side to apply a predetermined load, in which state the outer peripheral surface 11*d* of the shaft 10 and the inner peripheral surface 72*c* of the inner ring 72 of the lower side upper rolling bearing 70 are bonded together, and the outer peripheral surface 81*d* of the outer ring 81 of the lower side lower rolling bearing 80 and the lower inner peripheral surface 90*cb* of the lower sleeve 90 are bonded together. As a result, a preload is applied to the pair of the lower side upper rolling bearing 70 and the lower side lower rolling bearing 80.

Next, the collar portion 13 is fitted on the shaft 10, and the lower surface 13*b* of the collar portion 13 is abutted with the upper surface 72*a* of the inner ring 72 of the lower side upper rolling bearing 70, in which state the outer peripheral surface 11*d* of the shaft 10 and the inner peripheral surface 13*c* of the collar portion 13 are bonded together.

Next, the upper side lower rolling bearing 40 is fitted on the shaft 10, and the lower surface 42*b* of the inner ring 42 is abutted with the upper surface 13*a* of the collar portion 13, in which state the outer peripheral surface 11*d* of the shaft 10 and the inner peripheral surface 42*c* of the inner ring 42 are bonded together. Before the upper side upper rolling bearing 30 is fitted on the shaft 10, the upper side upper rolling bearing 30 is fitted in the upper sleeve 50, and the lower surface 31*b* of the outer ring 31 is abutted with the upper surface 52*a* of the spacer portion 52, in which state the outer peripheral surface 31*d* of the outer ring 31 and the upper inner peripheral surface 50*ca* of the upper sleeve 50 are bonded together in advance. The upper side lower rolling bearing 40 bonded to the upper sleeve 50, is fitted on the shaft 10, and the lower surface 52*b* of the spacer portion 52 is abutted with the upper surface 41*a* of the outer ring 41 of the upper side lower rolling bearing 40. Further, the inner ring 32 of the upper side upper rolling bearing 30 is pushed from the upper side towards the lower side to apply a predetermined load (which differs from the load applied to the collar portion 13 as described above), in which state the outer peripheral surface 11*d* of the shaft 10 and the inner peripheral surface 32*c* of the inner ring 32 of the upper side upper rolling bearing 30 are bonded together, and the outer peripheral surface 41*d* of the outer ring 41 of the upper side lower rolling bearing 40 and the lower inner peripheral surface 50*cb* of the upper sleeve 50 are bonded together. As a result, a preload is applied to the pair of the upper side upper rolling bearing 30 and the upper side lower rolling bearing 40.

In the assembling step like this, the natural frequency of the upper bearing unit 20 and the natural frequency of the lower bearing unit 60 in the axis Y1 direction of the shaft 10 are made to differ from each other by making the preload that is applied to the upper side upper rolling bearing 30 and the upper side lower rolling bearing 40 differ from the preload that is applied to the lower side upper rolling bearing 70 and the lower side lower rolling bearing 80. In this way, the pivot assembly bearing device 1 can be fabricated.

As described above, in the pivot assembly bearing device 1 according to the first embodiment of the present disclosure, the upper bearing unit 20 and the lower bearing unit 60 have the same structure and are formed of the same material. Additionally, the preload applied to the upper side upper rolling bearing 30 and the upper side lower rolling bearing 40 of the upper bearing unit 20 is made to differ from the preload applied to the lower side upper rolling bearing 70 and the lower side lower rolling bearing 80 of the lower bearing unit 60. Specifically, in the pivot assembly bearing device 1, the preload of 1000 (gf) is applied to the upper bearing unit 20, while the preload of 150 (gf) is applied to the lower bearing unit 60. As a result, in the pivot assembly bearing device 1, the natural frequency of the upper bearing unit 20 and the natural frequency of the lower bearing unit 60 in the axis Y1 direction of the shaft 10 can be made to differ by 2 kHz or more.

Figure 8:
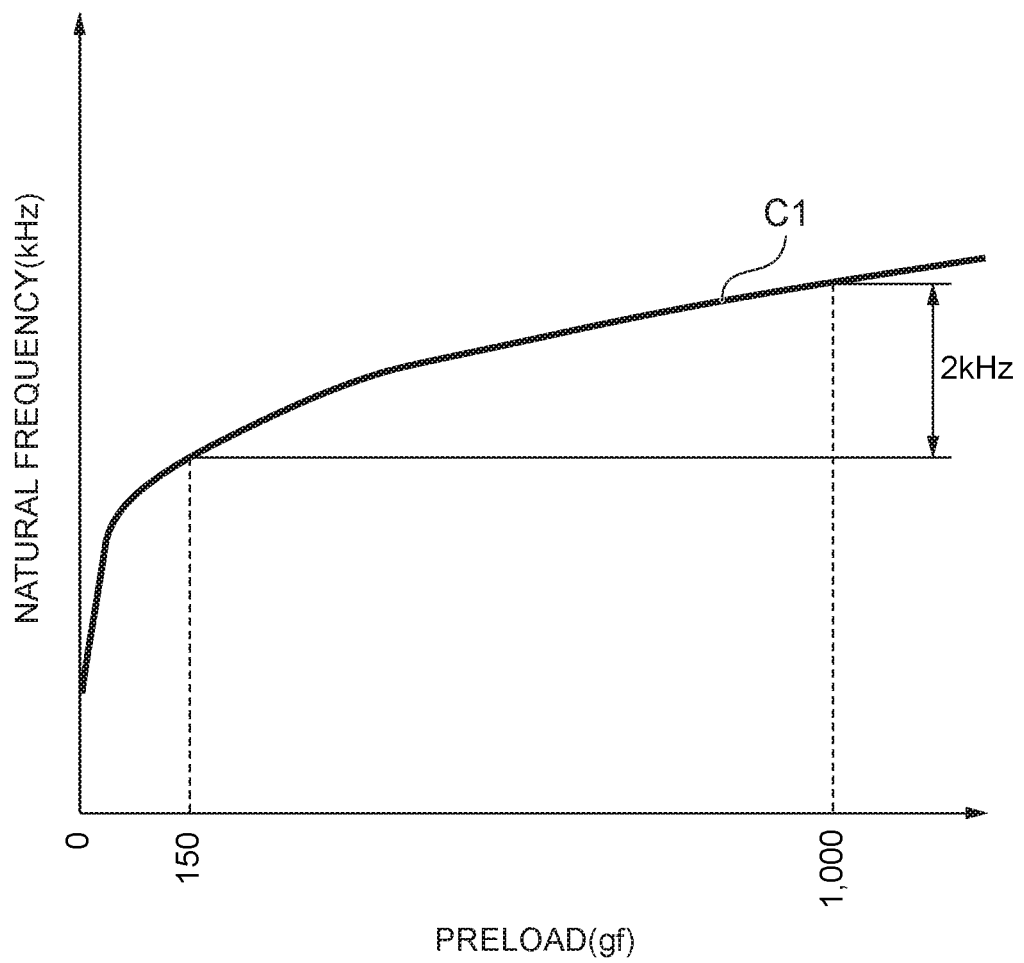
FIG. 8 is a graph showing a relationship between a preload and a natural frequency of each of the bearing units of the pivot assembly bearing device according to the first embodiment of the present disclosure.

FIG. 8 is a graph illustrating a relationship between preloads and natural frequencies of the upper bearing unit 20 and the lower bearing unit 60 of the pivot assembly bearing device 1. In FIG. 8, a horizontal axis denotes preload (gf), and a vertical axis denotes natural frequencies of the upper bearing unit 20 and the lower bearing unit 60 (a peak (a maximum value) of the gain G1 of the upper bearing unit 20 and a peak (a maximum value) of the gain G2 of the lower bearing unit 60). In FIG. 8, C1 is a curve C1 representing a relationship between preloads and natural frequencies of the upper bearing unit 20 and the lower bearing unit 60.

As can be seen from FIG. 8, when the preload that is being applied to the upper bearing unit 20 is 1000 (gf) and the preload that is being applied to the lower bearing unit 60 is 150 (gf), the natural frequency of the upper bearing unit 20 and the natural frequency of the lower bearing unit 60 differ by 2 kHz. Consequently, when the hard disk drive 100 is driven, a possibility of resonation of the upper bearing unit 20 and the lower bearing unit 60 can be reduced, as a result of which the generation of vibration in the upper bearing unit 20 and the lower bearing unit 60 can be reduced further, whereby the swing arms are enabled to swing stably.

Figure 9:
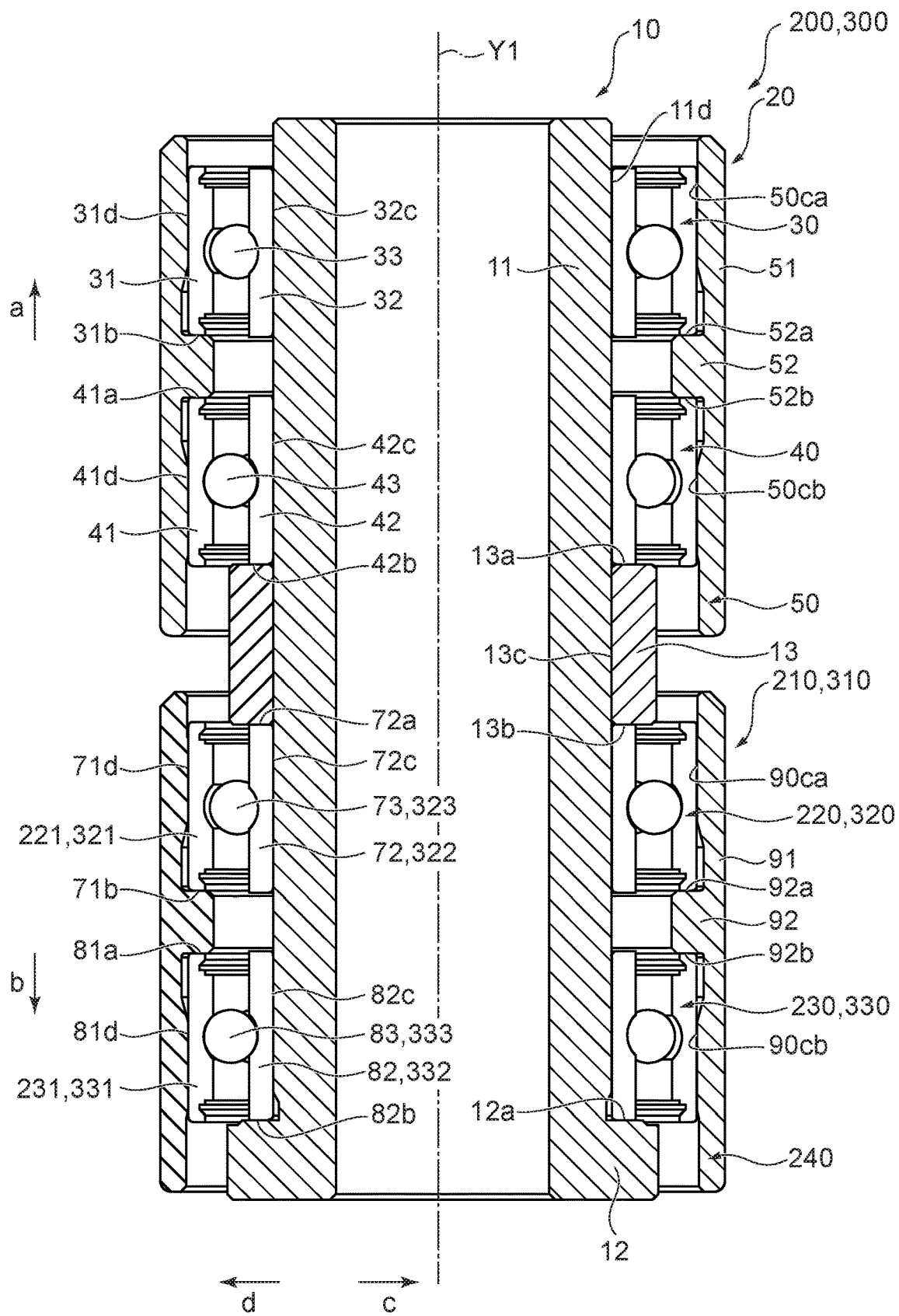
FIG. 9 is a cross-sectional view illustrating schematic configurations of pivot assembly bearing devices according to second and third embodiments of the present disclosure.

Next, the configuration of a pivot assembly bearing device 200 according to a second embodiment of the present disclosure will be described. FIG. 9 is a cross-sectional view illustrating a schematic configuration of the pivot assembly bearing device 200 according to the second embodiment of the present disclosure.

Hereinafter, same reference signs will be given to the same or similar configurations to those of the pivot assembly bearing device 1 according to the first embodiment described above so as to omit the description of these similar configurations, and only different configurations will be described. The pivot assembly bearing device 200 according to the second embodiment of the present disclosure differs in the configuration of a lower bearing unit from the pivot assembly bearing device 1 according to the first embodiment of the present disclosure described above. Specifically, in the pivot assembly bearing device 200, a lower bearing unit 210 is provided in place of the lower bearing unit 60.

The lower bearing unit 210 includes a lower side upper rolling bearing 220, a lower side lower rolling bearing 230, and a lower sleeve 240 that is disposed on outer peripheral surfaces of the lower side upper rolling bearing 220 and the lower side lower rolling bearing 230 and that extends in an axis Y1 direction. The lower sleeve 240 is held rotatably to a lower side (an arrow "b" direction) of a shaft 10 via the lower side upper rolling bearing 220 and the lower side lower rolling bearing 230 on a radially outer side of the shaft 10. The lower bearing unit 210 has the same structure as that of an upper bearing unit 20 and is formed of a material that is different from that of the upper bearing unit 20.

In the pivot assembly bearing device 200, a total mass of outer rings 31, 41 of an upper side upper rolling bearing 30 and an upper side lower rolling bearing 40 of the upper bearing unit 20 and an upper sleeve 50 differs from a total mass of outer rings 221, 231 of the lower side upper rolling bearing 220 and the lower side lower rolling bearing 230 of the lower bearing unit 210 and the lower sleeve 240. Specifically, the upper side upper rolling bearing 30 and the upper side lower rolling bearing 40 of the upper bearing unit 20 and the upper sleeve 50 are formed of aluminum material (A6061 series), and a specific gravity is 2.7. The lower bearing unit 210 is formed of austenitic stainless steel (SUS300 series), and a specific gravity is 7.9. Therefore, the upper bearing unit 20 and the lower bearing unit 210 have different specific gravities.

In the pivot assembly bearing device 200, a preload of 1000 (gf) is applied to the upper bearing unit 20, and a preload of 1100 (gf) is applied to the lower bearing unit 210. As a result, in the pivot assembly bearing device 200 according to the second embodiment of the present disclosure, a natural frequency of the upper bearing unit 20 and a natural frequency of the lower bearing unit 210 in the axis Y1 direction of the shaft 10 can be made to differ by 2 kHz or more.

In this way, in the pivot assembly bearing device 200 according to the second embodiment of the present disclosure, the upper bearing unit 20 and the lower bearing unit 210 have the same structure and different specific gravities. The preload that the upper side upper rolling bearing 30 and the upper side lower rolling bearing 40 of the upper bearing unit 20 receive is made to differ from the preload that the lower side upper rolling bearing 220 and the lower side lower rolling bearing 230 of the lower bearing unit 210 receive. Specifically, in the pivot assembly bearing device 200, the preload of 1000 (gf) is applied to the upper side upper rolling bearing 30 and the upper side lower rolling bearing 40 of the upper bearing unit 20, while the preload of 1100 (gf) is applied to the lower side upper rolling bearing 220 and the lower side lower rolling bearing 230 of the lower bearing unit 210. As a result, in the pivot assembly bearing device 200, the natural frequency of the upper bearing unit 20 and the natural frequency of the lower bearing unit 210 in the axis Y direction of the shaft 10 can be made to differ by 2 kHz or more.

Figure 10:
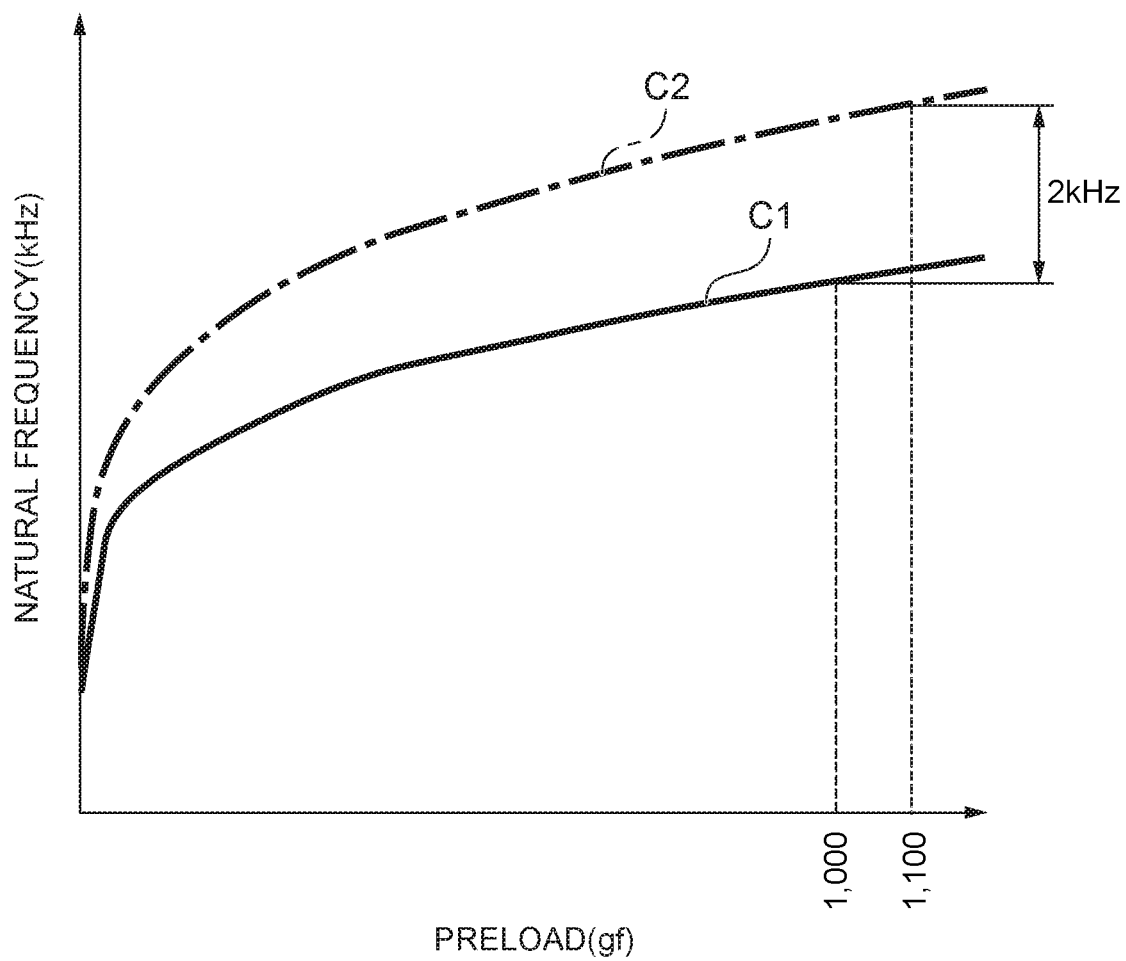
FIG. 10 is a graph illustrating a relationship between a preload and a natural frequency of each of bearing units of the pivot assembly bearing device according to the second embodiment of the present disclosure.

FIG. 10 is a graph illustrating a relationship between preloads and natural frequencies of the upper bearing unit 20 and the lower bearing unit 210 of the pivot assembly bearing device 200. In FIG. 10, a horizontal axis denotes preload (gf), and a vertical axis denotes natural frequencies of the upper bearing unit 20 and the lower bearing unit 210 (a peak (a maximum value) of a gain G1 of the upper bearing unit 20 and a peak (a maximum value) of a gain G2 of the lower bearing unit 210). In FIG. 10, C1 is a curve C1 representing a relationship between preloads and natural frequencies of the upper side upper rolling bearing 30 and the upper side lower rolling bearing 40 of the upper bearing unit 20, and C2 is a curve C2 representing a relationship between preloads and natural frequencies of the lower side upper rolling bearing 220 and the lower side lower rolling bearing 230 of the lower bearing unit 210. Since the upper bearing unit 20 and the lower bearing unit 210 have different specific gravities, the curves representing the relationship between preloads and natural frequencies of the upper bearing unit 20 and the lower bearing unit 210 differ.

As can be seen from FIG. 10, in the case where the specific gravities of the upper bearing unit 20 and the lower bearing unit 210 differ, and the preload applied to the upper bearing unit 20 is 1000 (gf), while the preload applied to the lower bearing unit 210 is 1100 (gf), the natural frequency of the upper bearing unit 20 and the natural frequency of the lower bearing unit 210 differ by 2 kHz. Consequently, when a hard disk drive 100 is driven, a possibility that the upper bearing unit 20 and the lower bearing unit 210 resonate can be reduced. As a result, the generation of vibration in the upper bearing unit 20 and the lower bearing unit 210 can be reduced further, whereby swing arms can swing stably.

Next, the configuration of a pivot assembly bearing device 300 according to a third embodiment of the present disclosure will be described. FIG. 9 is the cross-sectional view illustrating a schematic configuration of the pivot assembly bearing device 300 according to the third embodiment of the present disclosure.

Hereinafter, same reference signs will be given to the same or similar configurations to those of the pivot assembly bearing device 1 according to the first embodiment described above so as to omit the description of these same or similar configurations, and only different configurations will be described. The pivot assembly bearing device 300 according to the third embodiment of the present disclosure differs in the configuration of a lower side upper rolling bearing and a lowerside lower rolling bearing from the pivot assembly bearing device 1 according to the first embodiment of the present disclosure described above.

In the pivot assembly bearing device 300, a specification of an upper side upper rolling bearing 30 and an upper side lower rolling bearing 40 differs from a specification of a lower side upper rolling bearing 320 and a lower side lower rolling bearing 330 of the lower bearing unit 310. Specifically, a radial gap which is a specification of the upper side upper rolling bearing 30 and the upper side lower rolling bearing 40 is greater than a radial gap which is a specification of the lower side upper rolling bearing 320 and the lower side lower rolling bearing 330. That is, a gap in a radial direction between outer rings 31, 41 of the upper side upper rolling bearing 30 and the upper side lower rolling bearing 40 and rolling elements 33, 43 is greater than a gap in the radial direction between outer rings 321, 331 of the lower side upper rolling bearing 320 and the lower side lower rolling bearing 330 and rolling elements 323, 333.

An inner and outer ring curvature ratio which is a specification of the upper side upper rolling bearing 30 and the upper side lower rolling bearing 40 is greater than an inner and outer ring curvature ratio which is a specification of the lower side upper rolling bearing 320 and the lower side lower rolling bearing 330. That is, a ratio of a diameter of the rolling elements 33, 43 to a radius of raceway grooves in the outer rings 31, 41 and the inner rings 32, 42 is greater than a ratio of a diameter of the rolling elements 323, 333 to a radius of raceway grooves in the outer rings 321, 331 and the inner rings 322, 332. As a result, in the pivot assembly bearing device 300 according to the third embodiment of the present disclosure, a natural frequency of the upper bearing unit 20 and a natural frequency of the lower bearing unit 310 can be made to differ by 2 kHz or more while the same preload is applied to the upper bearing unit 20 and the lower bearing unit 310.

the lower bearing unit 310. Here, in the pivot assembly bearing device 300, for the upper bearing unit 20 and the lower bearing unit 310, an appropriate combination which makes the natural frequency of the upper bearing unit 20 and the natural frequency of the lower bearing unit 310 differ by 2 kHz or more can be selected from different specifications represented as specific examples 1 to 6 in Table 1. Specific examples of the specifications of the upper bearing unit 20 and the lower bearing unit 310 are not limited to the examples shown above.

It is desirable that the inner and outer ring curvature ratio of the upper side upper rolling bearing 30 and the upper side lower rolling bearing 40 and the inner and outer ring curvature ratio of the lower side upper rolling bearing 320 and the lower side lower rolling bearing 330 take the same value. In this case, in the specifications of the upper bearing unit 20 and the specifications of the lower bearing unit 310, for example, the radial gaps or masses only need to be set different from each other so that the natural frequency of the upper bearing unit 20 and the natural frequency of the lower bearing unit 310 differ by 2 kHz or more.

In the pivot assembly bearing device 300, a preload of 1000 (gf) is applied to the upper side upper rolling bearing 30 and the upper side lower rolling bearing 40 of the upper bearing unit 20, and a preload of 1000 (gf) is applied to the lower side upper rolling bearing 320 and the lower side lower rolling bearing 330 of the lower bearing unit 310. That is, in the pivot assembly bearing device 300, the same preload is applied to the upper bearing unit 20 and the lower bearing unit 310.

In this way, in the pivot assembly bearing device 300 according to the third embodiment of the present disclosure, the radial gap of the upper side upper rolling bearing 30 and the upper side lower rolling bearing 40 is greater than the radial gap of the lower side upper rolling bearing 320 and the lower side lower rolling bearing 330. Additionally, the inner and outer ring curvature ratio of the upper side upper rolling bearing 30 and the upper side lower rolling bearing 40 is greater than the inner and outer ring curvature ratio of the lower side upper rolling bearing 320 and the lower side lower rolling bearing 330. As a result, the natural frequency of the upper bearing unit 20 and the natural frequency of the

TABLE 1

| Specific Examples | 1 | 2 | 3 | 4 | 5 | 6 |
|---|---|---|---|---|---|---|
| Inner and outer ring curvature ratio | Outer ring 56%, Inner ring 53% | Outer ring 56%, Inner ring 53% | Outer ring 56%, Inner ring 53% | Outer ring 56%, Inner ring 53% | Outer ring 57%, Inner ring 57% | Outer ring 57%, Inner ring 57% |
| Total mass [g] of Outer ring and Sleeve | 0.5755 | 0.5755 | 1.151 | 1.151 | 1.151 | 1.151 |
| Preload [gf] | 500 | 500 | 500 | 500 | 500 | 500 |
| Radial gap [mm] | 0.005 | 0.01 | 0.005 | 0.01 | 0.005 | 0.0125 |
| Natural frequency [kHz] | 11.6 | 14.2 | 9.3 | 11.5 | 7.9 | 10.4 |

Table 1 is a table showing examples of specifications of the upper bearing unit 20 including the upper side upper rolling bearing 30 and the upper side lower rolling bearing 40 and specifications of the lower bearing unit 310 including the lower side upper rolling bearing 320 and the lower side lower rolling bearing 330 in the pivot assembly bearing device 300. As described above, in the pivot assembly bearing device 300, the natural frequency of the upper bearing unit 20 and the natural frequency of the lower bearing unit 310 are made to differ by 2 kHz or more by making the specifications of the upper bearing unit 20 differ from the specifications of the lower bearing unit 310 while the same preload is applied to the upper bearing unit 20 and lower bearing unit 310 differ by 2 kHz from each other. Consequently, when a hard disk drive 100 is driven, a possibility that the upper bearing unit 20 and the lower bearing unit 310 resonate can be reduced. As a result, the generation of vibration in the upper bearing unit 20 and the lower bearing unit 310 can be reduced further, whereby swing arms can swing stably.

Although the embodiments of the present disclosure have been described above, the present disclosure is not limited to the embodiments but includes all forms that are included in the concept and the scope of claims of the present disclosure. Additionally, the configurations may selectively be combined together as required so that at least part of the problems and advantageous effects that have been described above are exhibited. For example, in the embodiments, the shapes, materials, arrangements, sizes, and the like of the elements can be modified as required depending upon specific application forms of the present disclosure.

For example, in the pivot assembly bearing device 200 according to the second embodiment of the present disclosure, the embodiment of the present disclosure has been described by taking an example where the upper side upper rolling bearing 30 and the upper side lower rolling bearing 40 of the upper bearing unit 20 and the upper sleeve 50 are formed of aluminum material (A6061 series). However, the present disclosure is not limited to this configuration. For example, only the upper sleeve 50 may be formed of aluminum material (A6061 series). Even in this case, the natural frequency of the upper bearing unit 20 and the natural frequency of the lower bearing unit 210 can be made to differ by 2 kHz or more by changing the preloads that are applied to the upper bearing unit 20 and the lower bearing unit 210 or the like.

Figure 11:
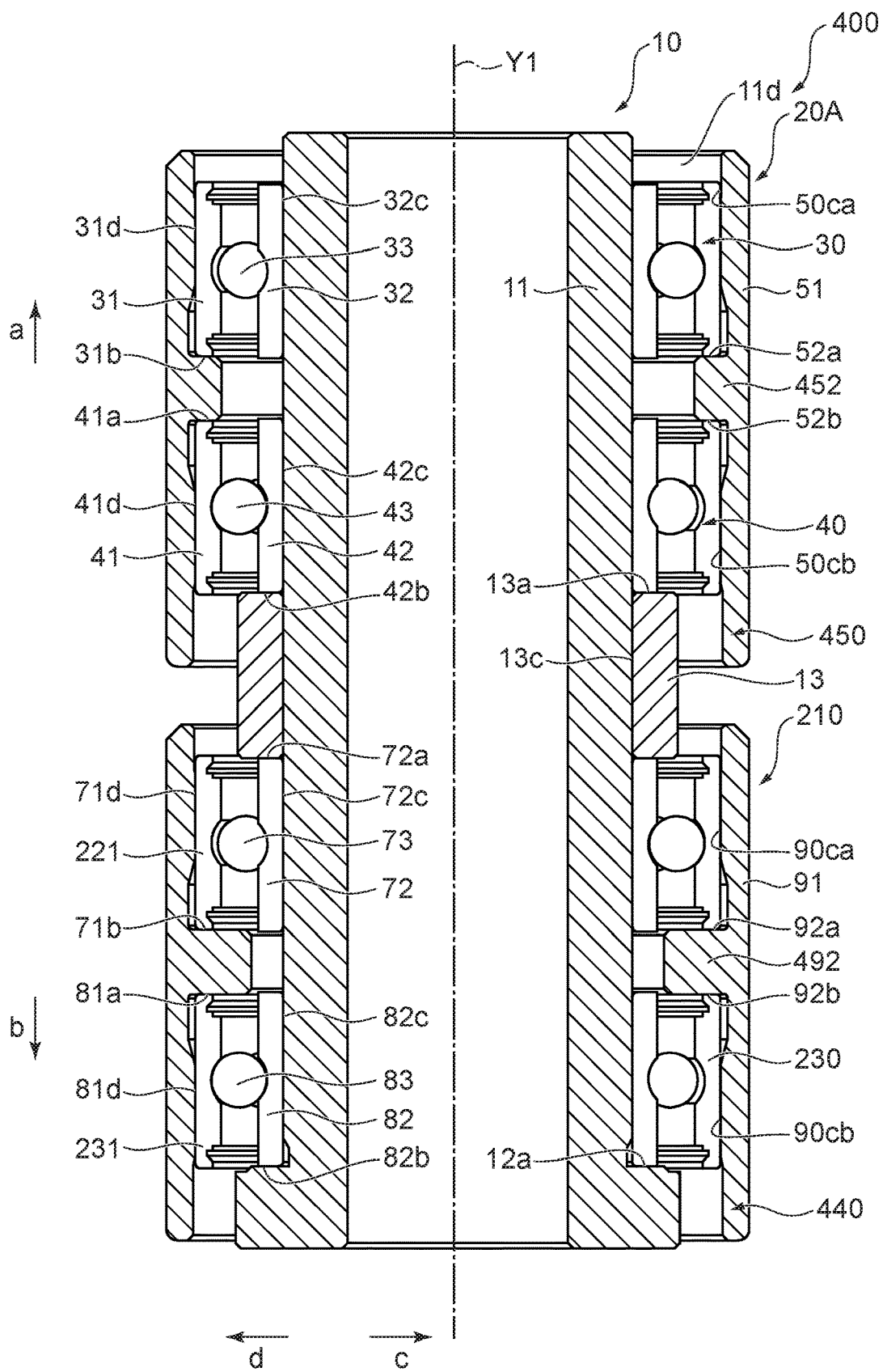
FIG. 11 is a cross-sectional view illustrating a schematic configuration of a modified example of the pivot assembly bearing device according to the second embodiment of the present disclosure.

FIG. 11 is a cross-sectional view illustrating a schematic configuration of a pivot assembly bearing device 400 according to a modified example made to the second embodiment of the present disclosure. In the pivot assembly bearing device 200 according to the second embodiment of the present disclosure, the embodiment of the present disclosure is described by taking an example where the mass of the upper bearing unit 20 is made to differ from the mass of the lower bearing unit 210 by making the material of the upper bearing unit 20 differ from the material of the lower bearing unit 210. However, the present disclosure is not limited to this configuration. As in the pivot assembly bearing device 400 according to the modified example illustrated in FIG. 11, a mass of an upper sleeve 450 and a mass of a lower sleeve 440 may be made to differ from each other by making a shape of the upper sleeve 450 of an upper bearing unit 20A differ from a shape of the lower sleeve 440 of a lower bearing unit 210.

The pivot assembly bearing device 400 is shaped so that a mass of the lower sleeve 440 on the lower side in an axis Y1 direction, which is a proximal end side of a shaft 10, is heavier than a mass of the upper sleeve 450 on the upper side in the axis Y1 direction, which is a distal end side of the shaft 10. Specifically, a lower spacer portion 492 of the lower sleeve 440 is shaped so as to be longer in a radial direction than an upper spacer portion 452 of the upper sleeve 450, whereby the mass of the lower sleeve 440 is heavier than that of the upper sleeve 450. Since a center of mass of the pivot assembly bearing device 400 is positioned lower due to the lower spacer portion 492 being heavier than the upper spacer portion 452, the entire device can be stabilized more.

In the pivot assembly bearing device 300 according to the third embodiment of the present disclosure, the embodiment of the present disclosure is described by taking an example where the specification of the upper side upper rolling bearing 30 and the upper side lower rolling bearing 40 differs from the specification of the lower side upper rolling bearing 320 and the lower side lower rolling bearing 330. However, the present disclosure is not limited to this configuration. For example, in addition to this, the natural frequency of the upper bearing unit 20 and the natural frequency of the lower bearing unit 310 may be made to differ by 2 kHz or more by changing the preloads applied to the upper bearing unit 20 and the lower bearing unit 310 or the materials of the upper bearing unit 20 and the lower bearing unit 310.

What is claimed is:

1. A pivot assembly bearing device, comprising:
a shaft that extends in an axial direction; and
a first bearing unit and a second bearing unit that are provided in the axial direction of the shaft,
wherein the first bearing unit comprises:
a pair of first rolling bearings provided in the axial direction of the shaft and each including a first inner ring fitted on the shaft, a first outer ring provided on an outer side of the first inner ring, and a plurality of first rolling elements that are provided between the first outer ring and the first inner ring; and
a first sleeve fixed to outer peripheral surfaces of the respective first outer rings of the pair of first rolling bearings, the pair of first rolling bearings being preloaded,
wherein the second bearing unit comprises:
a pair of second rolling bearings provided in the axial direction of the shaft and each including a second inner ring fitted on the shaft, a second outer ring provided on an outer side of the second inner ring, and a plurality of second rolling elements that are provided between the second outer ring and the second inner ring; and
a second sleeve fixed to outer peripheral surfaces of the respective second outer rings of the pair of second rolling bearings, the pair of second rolling bearings being preloaded,
wherein a natural frequency of the first bearing unit and a natural frequency of the second bearing unit differ from each other in the axial direction of the shaft,
wherein a preload that the pair of first rolling bearings receives and a preload that the pair of second rolling bearings receives are the same, wherein an inner and outer ring curvature ratio of the first outer rings and the first inner rings of the pair of first rolling bearings and an inner and outer ring curvature ratio of the second outer rings and the second inner rings of the pair of second rolling bearings are the same, and wherein the natural frequency of the first bearing unit and the natural frequency of the second bearing unit differ.

2. The pivot assembly bearing device according to claim 1, wherein a collar portion with which an end face of the first inner ring of the first rolling bearing and an end face of the second inner ring of the second rolling bearing which face each other are abutted is provided between the first bearing unit and the second bearing unit on an outer peripheral surface of the shaft.

3. The pivot assembly bearing device according to claim 1, wherein a first spacer portion with which end faces of the pair of first outer rings which face each other are abutted is provided between the pair of first rolling bearings on an inner peripheral surface of the first sleeve, and wherein
a second spacer portion with which end faces of a pair of the second outer rings which face each other are abutted is provided between the pair of second rolling bearings on an inner peripheral surface of the second sleeve.

4. The pivot assembly bearing device according to claim 1, wherein a total mass of the first outer rings of the pair of first rolling bearings and the first sleeve differs from a total mass of the second outer rings of the pair of second rolling bearings and the second sleeve.

5. The pivot assembly bearing device according to of claim 1, wherein a natural frequency of the first bearing unit and a natural frequency of the second bearing unit differ by 2 kHz or more.

6. The pivot assembly bearing device according to claim 5, wherein a radial gap of the pair of first rolling bearings differs from a radial gap of the pair of second rolling bearings.

7. The pivot assembly bearing device according to claim 5, wherein a total mass of the first outer rings of the pair of first rolling bearings and the first sleeve differs from a total mass of the second outer rings of the pair of second rolling bearings and the second sleeve.

* * * * *